(12) United States Patent
Schmitt et al.

(10) Patent No.: US 12,305,774 B2
(45) Date of Patent: May 20, 2025

(54) SYSTEMS AND METHODS FOR A THERMAL MANAGEMENT CONTROL VALVE WITH A LOUVER PLATE ASSEMBLY

(71) Applicant: HUSCO Automotive Holdings LLC, Waukesha, WI (US)

(72) Inventors: Austin Schmitt, Menomonee Falls, WI (US); Brian Heidemann, Lake Mills, WI (US); Benjamin Teich, Milwaukee, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 55 days.

(21) Appl. No.: 18/375,174

(22) Filed: Sep. 29, 2023

(65) Prior Publication Data

US 2024/0240730 A1 Jul. 18, 2024

Related U.S. Application Data

(60) Provisional application No. 63/438,934, filed on Jan. 13, 2023.

(51) Int. Cl.
 *F16K 31/524* (2006.01)
 *F16K 3/02* (2006.01)
 (Continued)

(52) U.S. Cl.
 CPC ...... *F16K 31/52475* (2013.01); *F16K 3/0254* (2013.01); *F16K 31/5286* (2013.01); *B60L 58/24* (2019.02); *Y10T 137/86759* (2015.04)

(58) Field of Classification Search
 CPC ............. F16K 31/52475; F16K 3/0254; F16K 31/5286; B60L 58/24; Y10T 137/86759
 (Continued)

(56) References Cited

U.S. PATENT DOCUMENTS 1,567,537 A * 12/1925 Mockus ................ F16K 31/523
 137/625.33
2,601,231 A * 6/1952 Smith ................... F16K 3/0209
 137/625.33

(Continued)

FOREIGN PATENT DOCUMENTS

WO WO-2023/023277 A1 2/2023

OTHER PUBLICATIONS

International Search Report and Written Opinion for International Application No. PCT/US2024/011360, mailed May 10, 2024, 8 pages.

*Primary Examiner* — John Bastianelli
(74) *Attorney, Agent, or Firm* — FOLEY & LARDNER LLP

(57) ABSTRACT

A thermal management control valve includes a first housing defining a first fluid chamber, a second housing coupled to the first housing and defining a second fluid chamber, a rotary actuator having a drive shaft that defines a drive axis, a cam coupled to the drive shaft and having a cam slot, and a louver plate sealed between the first housing and the second housing and having a plurality of louver slots extending through the louver plate along a louver flow direction. The louver plate is coupled to the cam slot so that rotation of the cam selectively moves the louver plate along a radial direction relative to the drive axis. The radial direction is perpendicular to the louver flow direction.

18 Claims, 29 Drawing Sheets

(51) Int. Cl.
*F16K 31/528* (2006.01)
*B60L 58/24* (2019.01)

(58) Field of Classification Search
USPC ............ 137/625.33; 251/251–263, 121, 127, 251/326–329
See application file for complete search history.

(56) References Cited

U.S. PATENT DOCUMENTS

| | | | |
|---|---|---|---|
| 2,993,488 A | | 7/1961 | Stec |
| 3,269,694 A | | 8/1966 | Hardison |
| 3,318,568 A | * | 5/1967 | Blomstran ........ F16K 31/52475 |
| | | | 251/327 |
| 4,643,226 A | * | 2/1987 | Balz ..................... F16K 3/0209 |
| | | | 137/625.33 |
| 4,972,878 A | * | 11/1990 | Carlin ..................... F16K 3/316 |
| | | | 251/266 |
| 5,230,367 A | * | 7/1993 | Minch ............... F16L 55/02718 |
| | | | 137/625.33 |
| 7,255,324 B2 | * | 8/2007 | Schlude ............ F16K 31/52491 |
| | | | 251/251 |
| 2021/0062687 A1 | | 3/2021 | Siefker et al. |
| 2021/0348689 A1 | | 11/2021 | Mann |

* cited by examiner

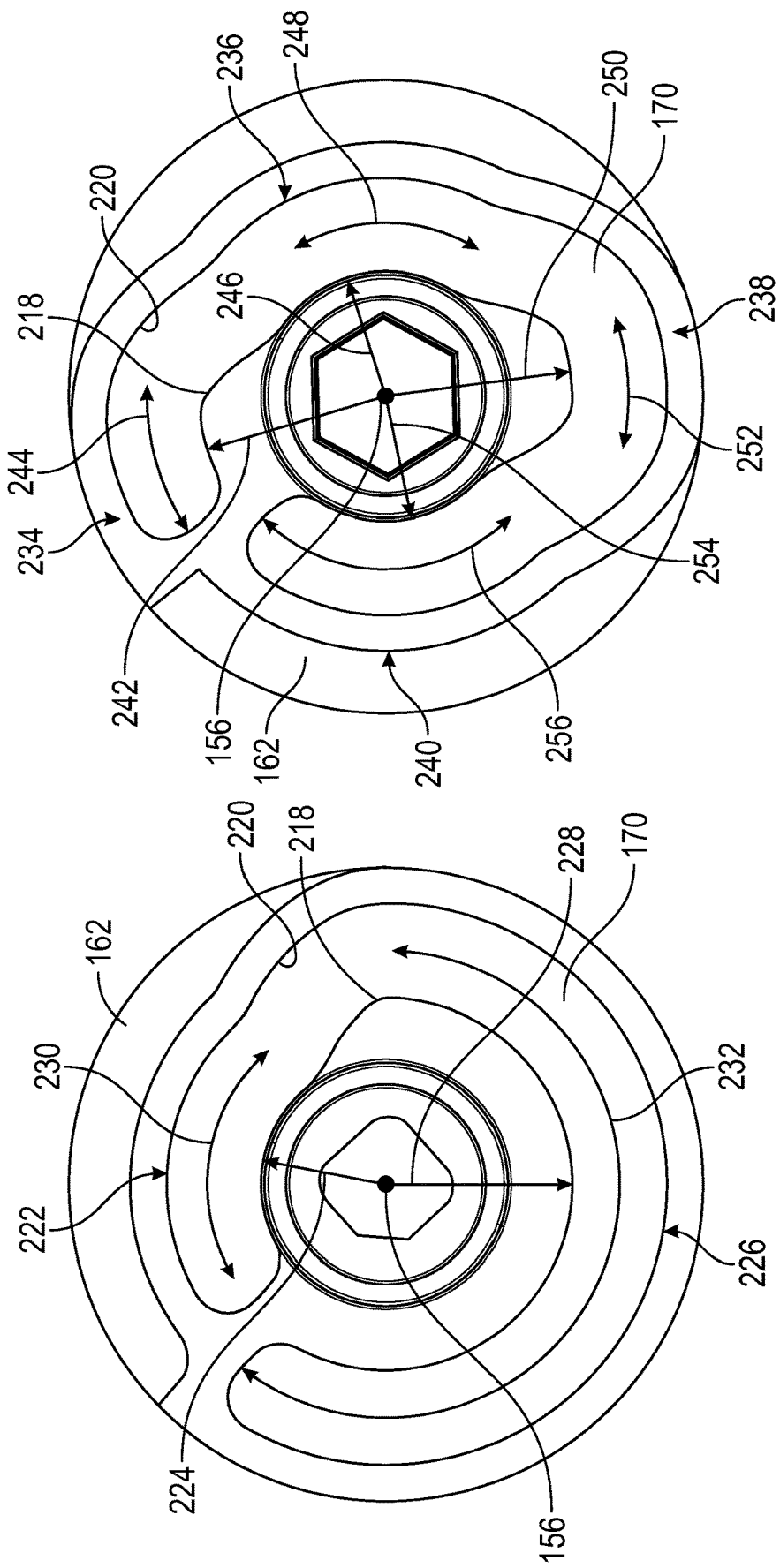

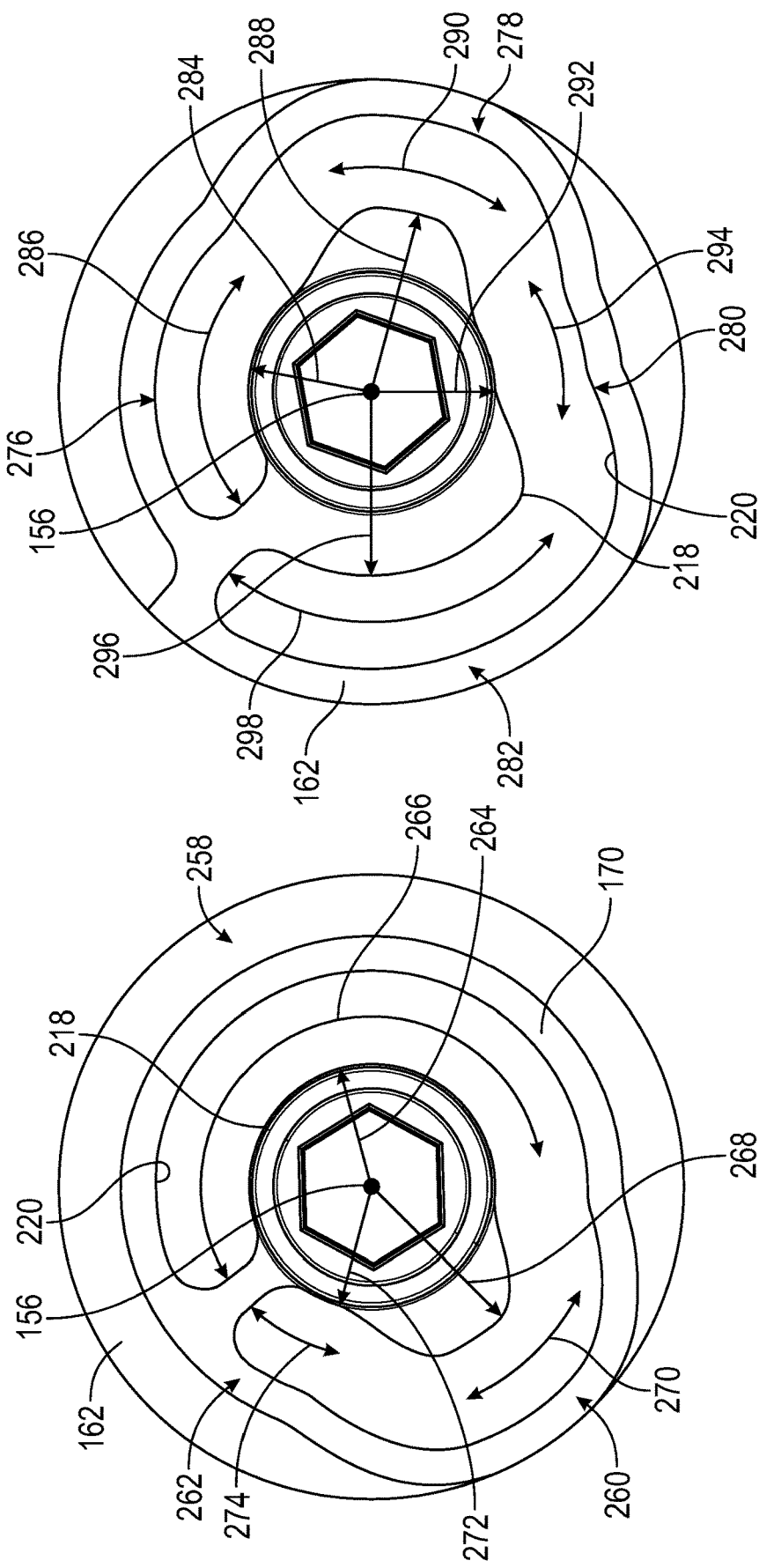

SYSTEMS AND METHODS FOR A THERMAL MANAGEMENT CONTROL VALVE WITH A LOUVER PLATE ASSEMBLY

CROSS-REFERENCE TO RELATED PATENT APPLICATIONS

This application claims the benefit of and priority to U.S. Provisional Application No. 63/438,934, filed on Jan. 13, 2023, the entire disclosure of which is hereby incorporated by reference herein.

BACKGROUND

Thermal control valves are used, for example, in hybrid and battery-powered vehicle applications to control a flow of working fluid that acts to heat or cool a device or component.

SUMMARY

At least one embodiment relates to a thermal management control valve for an electric vehicle. The thermal management control valve includes a first housing defining a first fluid chamber, a second housing coupled to the first housing and defining a second fluid chamber, a rotary actuator having a drive shaft that defines a drive axis, a cam coupled to the drive shaft and having a cam slot, and a louver plate sealed between the first housing and the second housing and having a plurality of louver slots extending through the louver plate along a louver flow direction. The louver plate is coupled to the cam slot so that rotation of the cam selectively moves the louver plate along a radial direction relative to the drive axis. The radial direction is perpendicular to the louver flow direction.

Another embodiment relates to a thermal management control valve for an electric vehicle. The thermal management control valve includes a first housing, a second housing coupled to the first housing at a bonding interface formed between the first housing and the second housing, a rotary actuator having a drive shaft, a cam coupled to the drive shaft and having a cam slot, and a louver plate sealed between the first housing and the second housing and having a plurality of louver slots extending through the louver plate. The drive shaft is offset from the bonding interface so that the bonding interface extends linearly past the drive shaft. The louver plate is coupled to the cam slot so that rotation of the cam linearly moves the louver plate to selectively allow or inhibit fluid flow through the plurality of louver slots.

Another embodiment relates to a thermal management control valve for an electric vehicle. The thermal management control valve includes a first housing, a second housing coupled to the first housing, a rotary actuator including a drive shaft that defines a drive axis, a cam coupled to the drive shaft, and a plurality of louver plate assemblies coupled to the cam and arranged between the first housing and the second housing. Each of the plurality of louver plate assemblies includes a louver plate with a louver slot and a louver surface defining a surface normal that extends in a direction perpendicular to both the drive axis and a radial direction defined relative to the drive axis. The rotary actuator is configured to rotate the cam to a predefined rotary position so that the louver plates move along the radial direction to selectively allow or inhibit fluid flow through the louver slots. Each of the louver surfaces is coplanar.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which:

FIG. 13 is a front view of a cam wheel of the flow control assembly of FIG. 6, according to an exemplary embodiment;

FIG. 14 is a front view of a cam wheel of the flow control assembly of FIG. 6, according to another exemplary embodiment;

FIG. 15 is a front view of a cam wheel of the flow control assembly of FIG. 6, according to another exemplary embodiment;

FIG. 16 is a front view of a cam wheel of the flow control assembly of FIG. 6, according to another exemplary embodiment;

DETAILED DESCRIPTION

Figure 1:
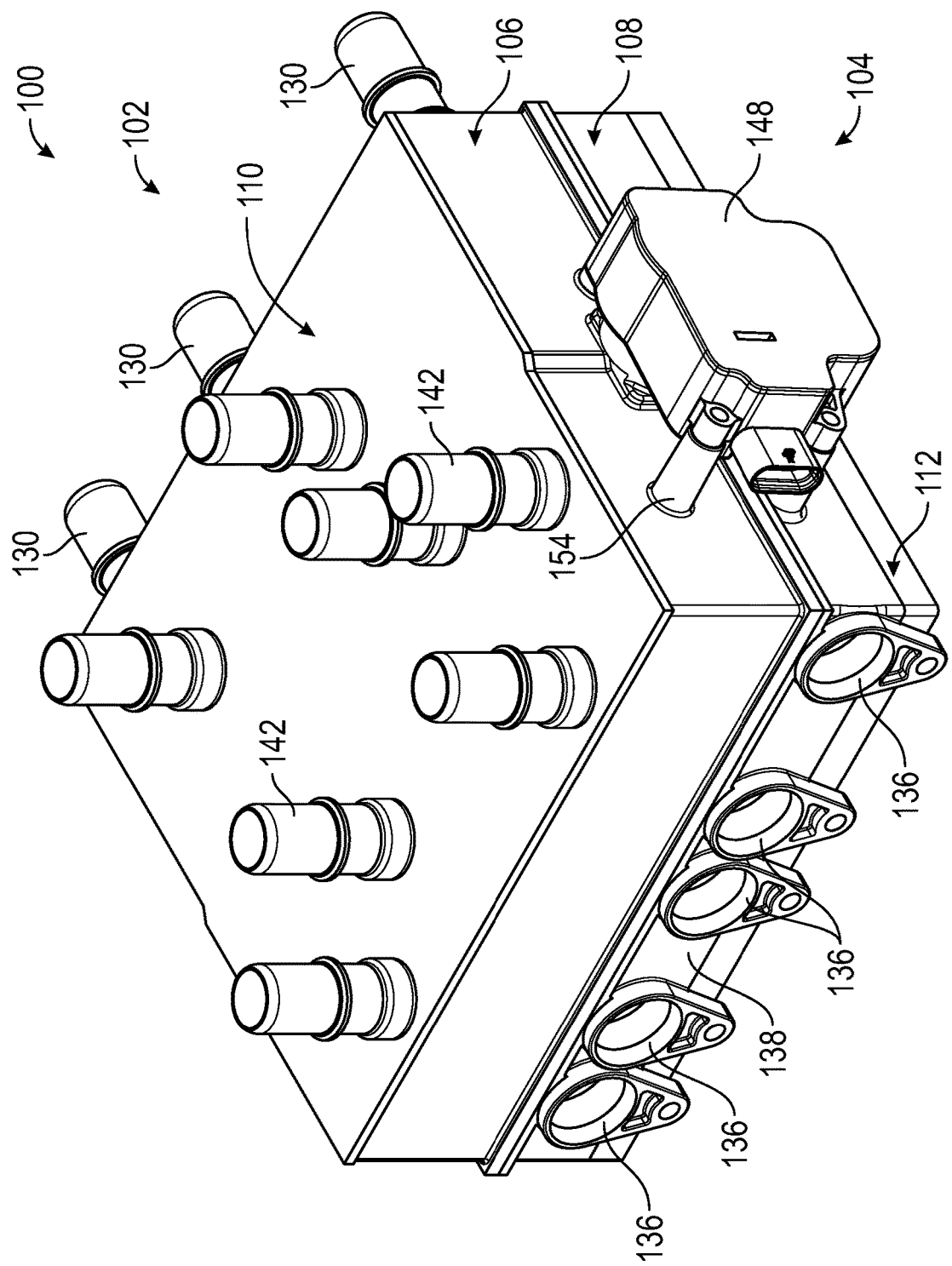
FIG. 1 is a top, front, right perspective view of a thermal management control valve, according to an exemplary embodiment.
Figure 2:
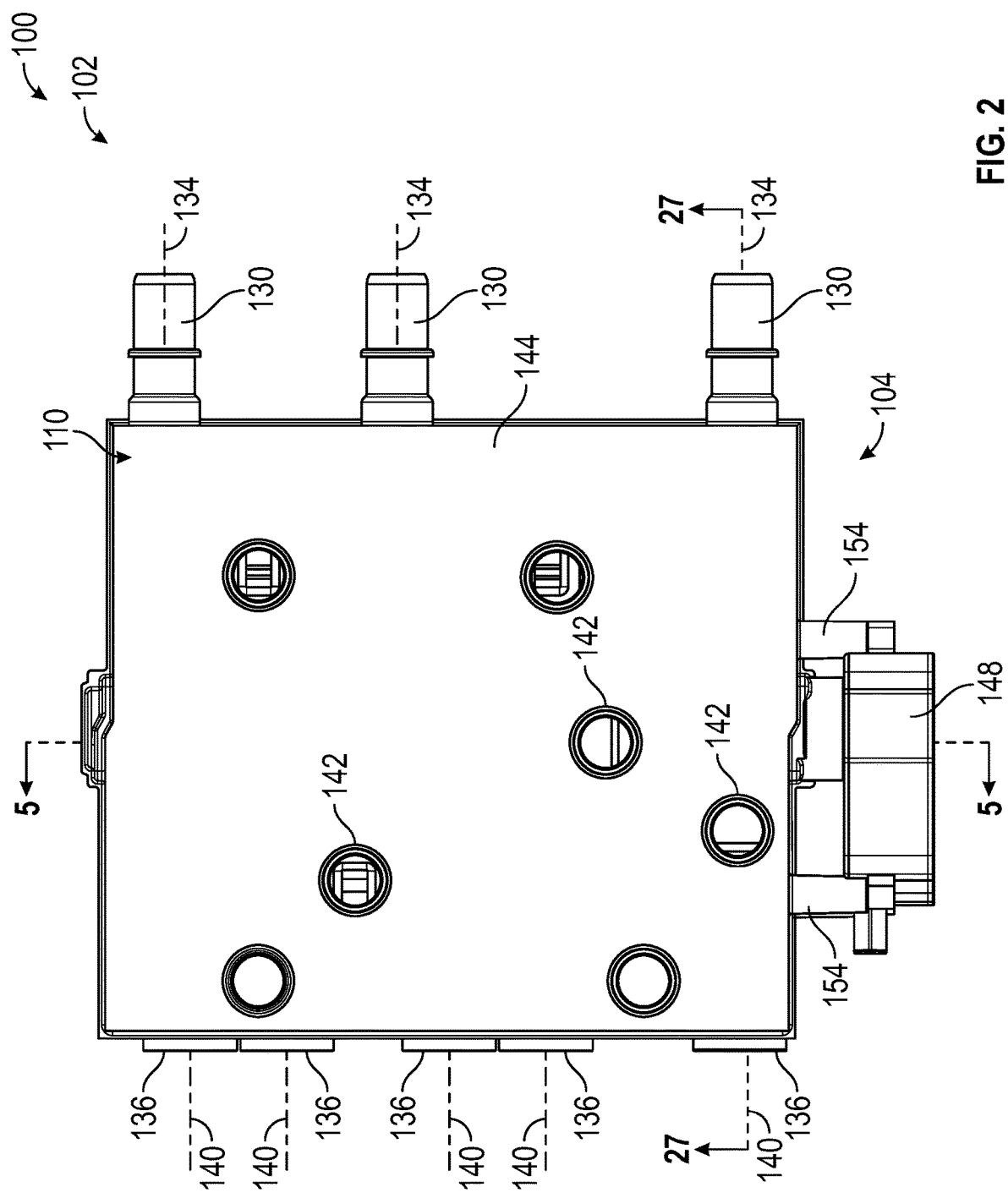
FIG. 2 is a top view of the thermal management control valve of FIG. 1.
Figure 3:
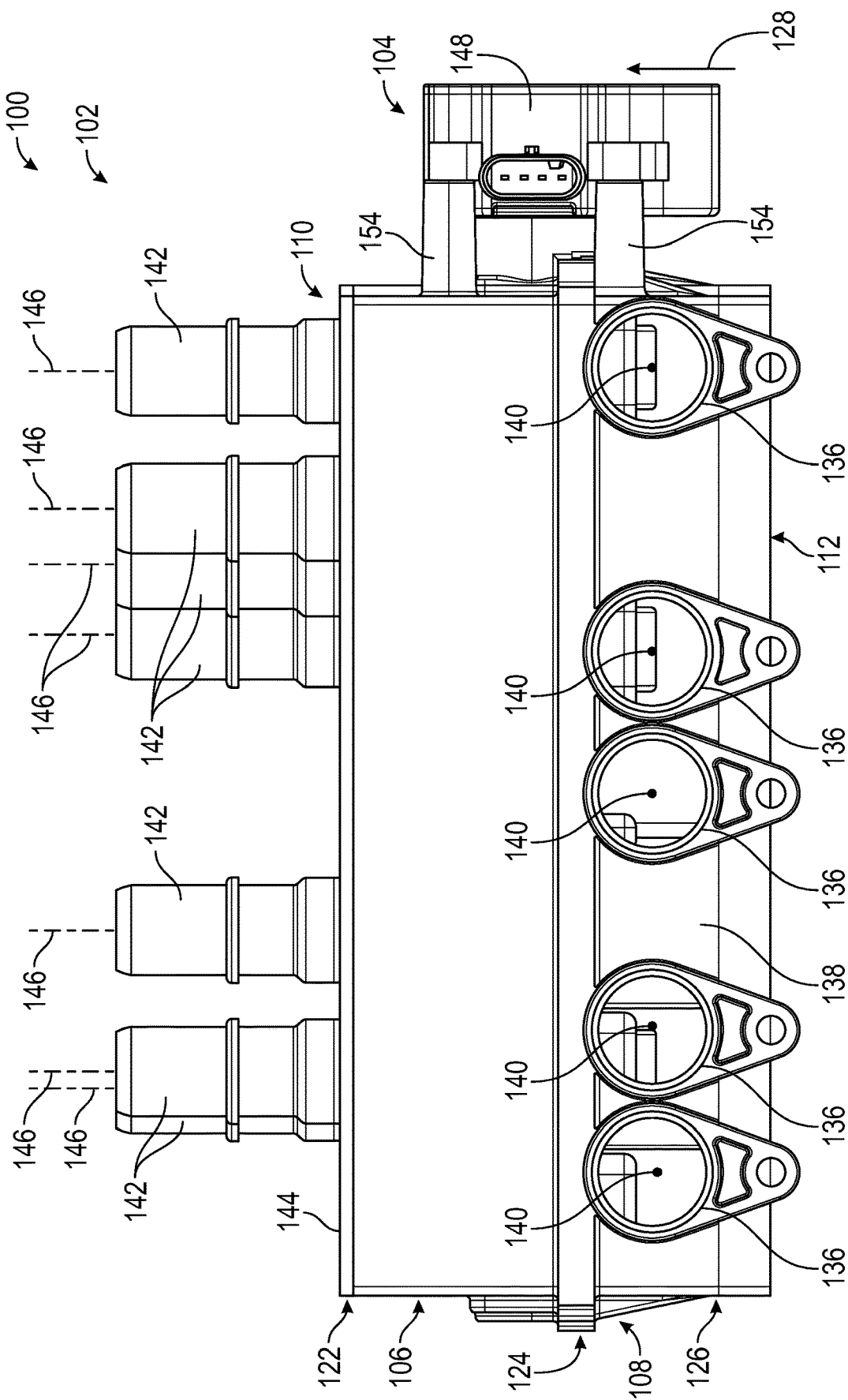
FIG. 3 is a right side view of the thermal management control valve of FIG. 1.
Figure 4:
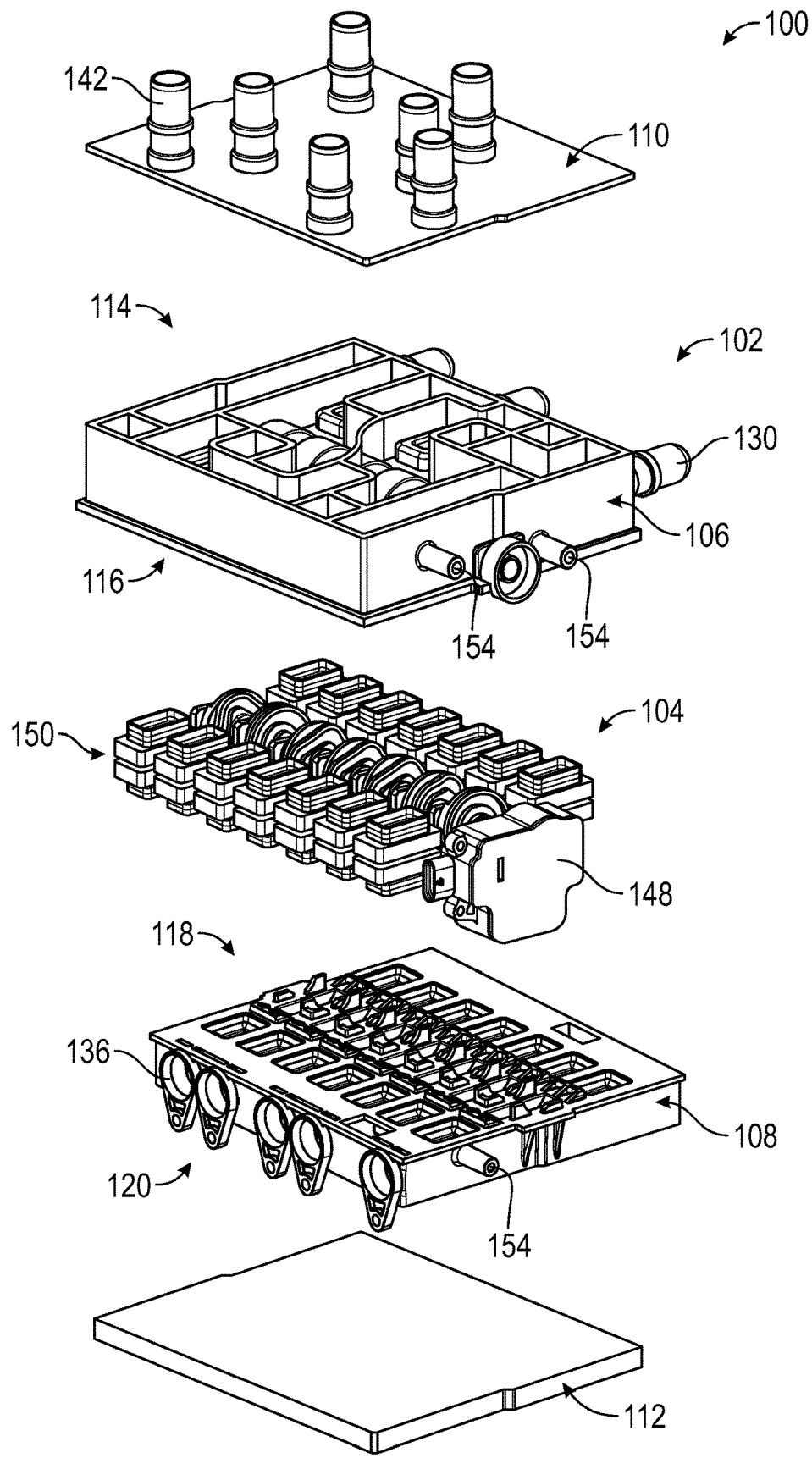
FIG. 4 is a top, front, right exploded perspective view of the thermal management control valve of FIG. 1.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The use herein of the term "axial" and variations thereof refers to a direction that extends generally along an axis of symmetry, a central axis, or an elongate direction of a particular component or system. For example, axially extending features of a component may be features that extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to a direction that extends generally around a circumference of an object or around an axis of symmetry, a central axis or an elongate direction of a particular component or system.

Hybrid electric and battery electric vehicles include a high-voltage battery or an array of high-voltage battery packs that supply electric power to various components on the vehicle (e.g., drive motors, user interfaces, power take off (PTO) units, electric power steering motors, etc.). The automotive vehicle market (e.g., on-road or on-highway vehicles) is trending toward the development of longer all-electric ranges to allow a user to drive longer distances between battery charges. The demand for longer all-electric range requires batteries/battery packs with higher capacities that define a larger mounting footprint/volume, when compared to lower all-electric range vehicles. Also, increasing the battery/battery pack capacity typically increases the thermal management demand (e.g., heating and cooling capacities) required to provide temperature control of the battery/battery pack and the various other components on the vehicle that are actively or passively heated and/or cooled (e.g., power electronics, drive motors, HVAC systems etc.). So there is less space available to mount thermal management components (e.g., control valves, pumps, heat exchangers, conduits/tubing) and a need for the thermal management components to meet higher requirements for heating and cooling capacities, which is conventionally accommodated by using larger thermal management components.

The systems and methods of the present disclosure relate to a thermal management control valve that is designed to accommodate the current market demands for automotive electric vehicles by defining a reduced mounting footprint/volume, when compared to conventional control valves, and being configurable to accommodate various application flow port arrangements, among providing other operational advantages. For example, the thermal management control valve includes a housing assembly that are stacked and/or mount together along various coplanar interfaces. The stacking and mounting of the housing assembly along the various coplanar interfaces reduces the mounting footprint/volume of the thermal management control valve and increases manufacturing efficiency and cost by allowing simplified material bonding (e.g., plastic bonding) processes to be implemented when bonding the housing assembly.

Additionally, the thermal management control valve includes flow control assemblies (e.g., louver plate assemblies) that are coplanar, which further aids in reducing the mounting footprint/volume, and that move in a direction that is perpendicular to a pressure drop acting across the flow control assemblies. In this way, for example, a pressure differential (e.g., back pressure) acting on the flow control assemblies does not act to open or close the flow control assemblies and the force required to move the flow control assemblies is not directly affected by the pressure drop. In other words, the actuation force required to move the flow control assemblies does not substantially increase in proportion to the pressure drop acting on the flow control assemblies, and the power requirements of the actuator used to move the flow control assemblies is significantly reduced, when compared to conventional thermal management control valves. Reducing the power requirements of the actuator both significantly reduces the cost of the thermal management control valve and the size of the actuator.

FIGS. 1-5 show a thermal management control valve 100, according to an exemplary embodiment of the present disclosure. In general, the thermal management control valve 100 is configured to provide control fluid flow (e.g., direction, routing, flowrate, and/or on/off control) for one or more working fluids in heating and/or cooling systems on an electric vehicle. The use of the term "electric vehicle" and variations thereof refers to a battery electric vehicle, a fully electric vehicle, a plug-in-hybrid vehicle, or a hybrid vehicle that is intended to be driven on a road or highway. In some embodiments, the thermal management control valve 100 provides flow control for a single type of working fluid (e.g., air, water, refrigerant, oil, etc.).

The thermal management control valve 100 includes a housing assembly 102 and a flow control assembly 104 enclosed within the housing assembly 102. The housing assembly 102 includes a first or upper housing section 106, a second or lower housing section 108, a first or upper housing cover 110, and a second or lower housing cover 112. In some embodiments, the first housing section 106, the second housing section 108, the first housing cover 110, and the second housing cover 112 are fabricated from a polymer or plastic material. In some embodiments, the first housing section 106, the second housing section 108, the first housing cover 110, and the second housing cover 112 are manufactured via a plastic injection molding. In some embodiments, the first housing section 106, the second housing section 108, the first housing cover 110, and the second housing cover 112 may be plastic injection molded using one or two pull directions, which improves manufacturing efficiency.

The first housing cover 110 is coupled to a first or top side 114 of the first housing section 106, and a second or bottom side 116 of the first housing section 106 is coupled to a first or top side 118 of the second housing section 108. The second housing cover 112 is coupled to a second or bottom side 120 of the second housing section 108. In general, each of the couplings formed between the first housing section 106, the second housing section 108, the first housing cover 110, and the second housing cover 112 is formed along a coplanar interface. For example, the coupling between the first housing cover 110 and the first housing section 106 occurs at a first bonding interface 122. When the first housing cover 110 is mounted on the first housing section 106 (see, e.g., FIGS. 3 and 5), the first bonding interface 122 is formed between coplanar surfaces of the first housing cover 110 and the first housing section 106. Similarly, a second bonding interface 124 formed between the first housing section 106 and the second housing section 108 is formed between coplanar surfaces of the first housing section 106 and the second housing section 108, and a third bonding interface 126 formed between the second housing section 108 and the second housing cover 112 is formed between coplanar surfaces of the second housing section 108 and the second housing cover 112. Forming each of the first bonding interface 122, the second bonding interface 124, and the third bonding interface 126 between coplanar surfaces forms coplanar bonding interfaces that enable a simplified and efficient bonding processes to be utilized to form the bonds between the first housing section 106, the second housing section 108, the first housing cover 110, and the second housing cover 112. Additionally, forming the bonds between the first housing section 106, the second housing section 108, the first housing cover 110, and the second housing cover 112 along coplanar bonding interfaces improves the manufacturing efficiency of the housing assembly 102. In some embodiments, the bonds are formed along the first bonding interface 122, the second bonding interface 124, and the third bonding interface 126 by a plastic welding process.

With continued reference to FIGS. 1-5, each of the first housing section 106, the second housing section 108, and the first housing cover 110 include one or more ports that facilitate a connection between the housing assembly 102 and a thermal management component (e.g., a heat exchanger, a conduit/tube, etc.) or another port on an electric vehicle. In general, the housing assembly 102 may be designed to include any port configuration (e.g., number and arrangement of the ports) dictated by a particular electric vehicle application. In some embodiments, the port configuration may be quickly and efficiently changed by modifying a mold design used to plastic injection mold the housing assembly 102. In some embodiments, the housing assembly 102 includes a first port that defines a first port axis that is arranged parallel to a second port axis of a second port. In some embodiments, the housing assembly 102 includes a first port that defines a first port axis that is arranged perpendicular to a second port axis of a second port.

In the illustrated embodiment, the first housing section 106 includes a plurality of first ports 130 extending outwardly from and through an outer surface 132 of the first housing section 106. As will be described herein, each of the first ports 130 is in fluid communication with a fluid chamber arranged within the first housing section 106. In the illustrated embodiment, the first housing section 106 includes three of the first ports 130, each being arranged on the outer surface 132 (see, e.g., FIG. 17). In some embodiments, the first housing section 106 may include more or less than three of the first ports 130 arranged on any of the outer surfaces of the first housing section 106. Each of the first ports 130 defines a first port axis 134 that extends along a centerline of the first ports 130 (see, e.g., FIG. 2). In some embodiments, the first port axes 134 are coplanar and each of the first ports 130 is arranged within a common component (i.e., the first housing second 106, which aids in reducing the effect of the bonding process on the tolerances for the location of the first ports 130. For example, the bonding process may act to increase the tolerances associated with locating the first ports 130 and arranging the first ports 130 within a common component (i.e., the first housing section 106) in a coplanar arrangement reduces this effect.

In the illustrated embodiment, the second housing section 108 includes a plurality of second ports 136 extending through an outer surface 138 of the second housing section 108. As will be described herein, each of the second ports 136 is in fluid communication with a fluid chamber arranged within the second housing section 108. In the illustrated embodiment, the second housing section 108 includes five of the second ports 136, each being arranged on the outer surface 138. In some embodiments, the second housing section 108 may include more or less than three of the second ports 136 arranged on any of the outer surfaces of the second housing section 108. Each of the second ports 136 defines a second port axis 140 that extends along a centerline of the second ports 136 (see, e.g., FIGS. 2 and 3). In the illustrated embodiments, the second port axes 140 are coplanar and each of the second ports 136 is arranged within a common component (i.e., the second housing second 108), which aids in reducing the effect of the bonding process on the tolerances for the location of the second ports 136. For example, the bonding process may act to increase the tolerances associated with locating the second ports 136 and arranging the second ports 136 within a common component (i.e., the second housing section 108) in a coplanar arrangement reduces this effect. In some embodiments, the second ports 136 are application ports that are connected to a thermal management component (e.g., heat exchangers) on an electric vehicle (see, e.g., FIGS. 30 and 31). Accordingly, the coplanar arrangement defined by the second ports 136 helps ensure that the second ports 136 are properly oriented relative to the ports on the thermal management components after installation on the electric vehicle.

In the illustrated embodiment, the first housing cover 110 includes a plurality of third ports 142 extending outwardly from and through an outer surface 144 of the first housing cover 110. As will be described herein, each of the third ports 142 is in fluid communication with a fluid chamber within the first housing section 106. In the illustrated embodiment, the first housing cover 110 includes seven of the third ports 142 on the outer surface 144. In some embodiments, the first housing cover 110 includes more or less than seven of the third ports 142 arranged at any location on the outer surface 144. Each of the third ports 142 defines a third port axis 146 that extends along a centerline of the third ports 142 (see, e.g., FIG. 3). In the illustrated embodiment, the first port axes 134 are arranged parallel to the second port axes 140, and the third port axes 146 are arranged perpendicular to both the first port axes 134 and the second port axes 140.

In the illustrated embodiment, the second housing cover 112 does not include a port. In some embodiments, the second housing cover 112 includes one or more ports (e.g., fourth ports) that extend through the second housing cover 112 and are each in fluid communication with a fluid chamber within the second housing section 108.

In general, the flow control assembly 104 is configured to selectively control fluid flow between the ports (e.g., the first ports 130, the second ports 136, and the third ports 142) and the fluid chambers arranged within the first housing section 106 and the second housing section 108. For example, the flow control assembly 104 includes a rotary actuator 148 (e.g., a rotary motor, a stepper motor, an electric motor, etc.) and a plurality of louver plate assemblies 150. The rotary actuator 148 includes a drive shaft 152 that is configured to rotate in in a predetermined direction and a predetermined magnitude in response to energization of the rotary actuator 148. In the illustrated embodiment, the rotary actuator 148 is coupled to the housing assembly 102 by actuator mounting posts 154 that extend outwardly from the first housing section 106 and the second housing section 108. The drive shaft 152 defines a drive axis 156 and extends into the first housing section 106 through an actuator hub 158 that extends outwardly from the first housing section 106.

Figure 5:
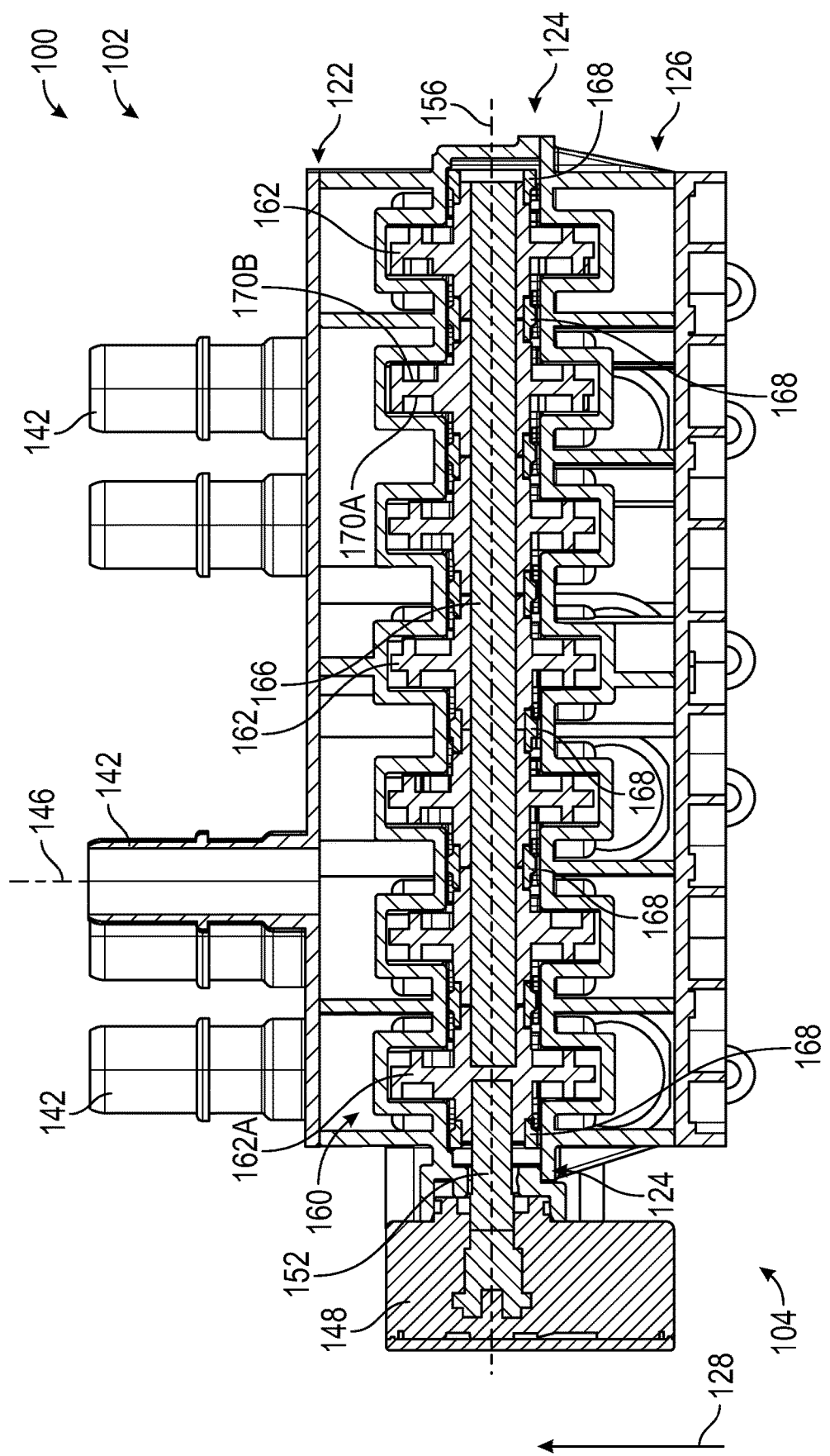
FIG. 5 is a cross-sectional view of the of the thermal management control valve of FIG. 2 taken along line 5-5.
Figure 6:
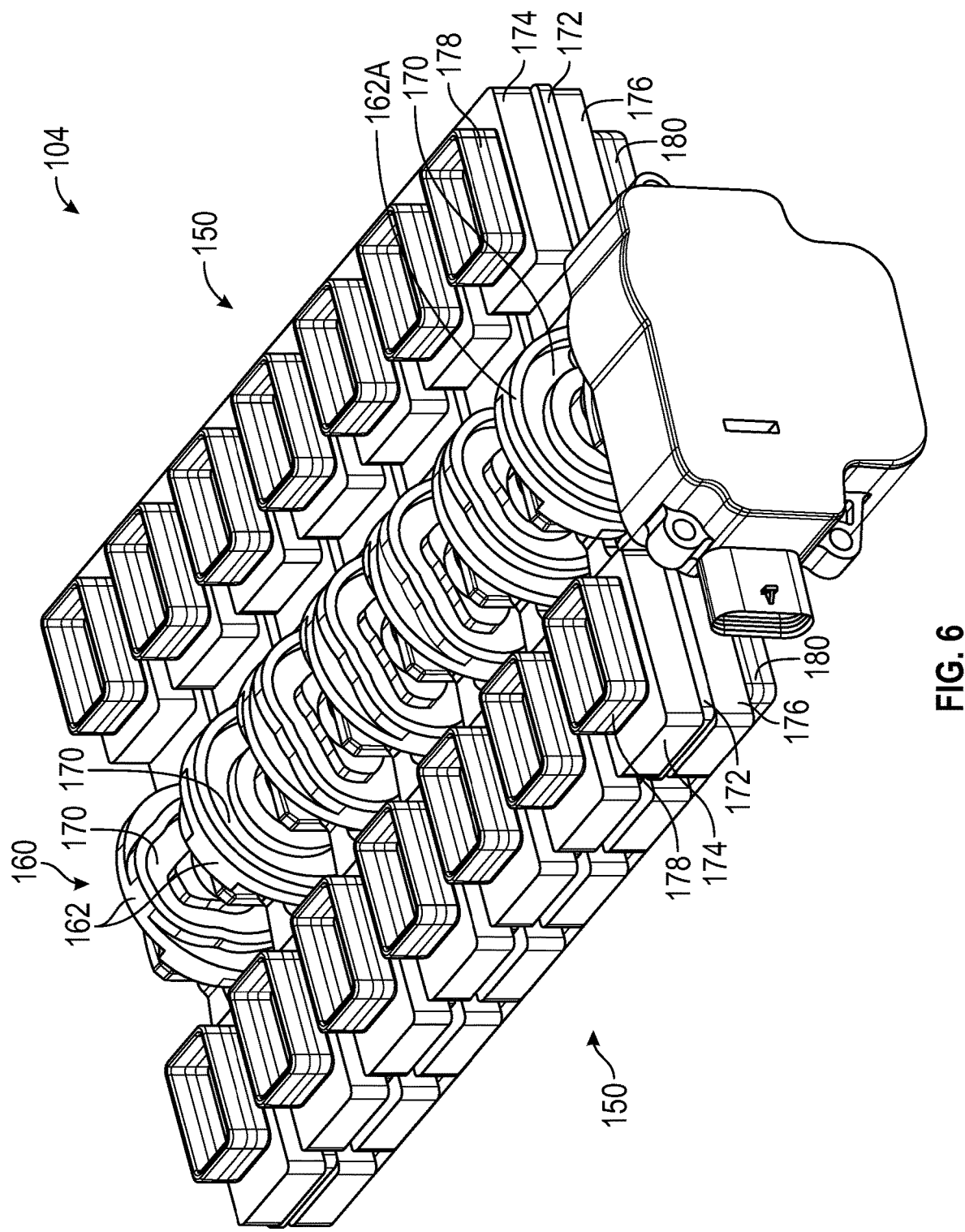
FIG. 6 is a top, front, right perspective view of a flow control assembly of the thermal management control valve of FIG. 1.
Figure 7:
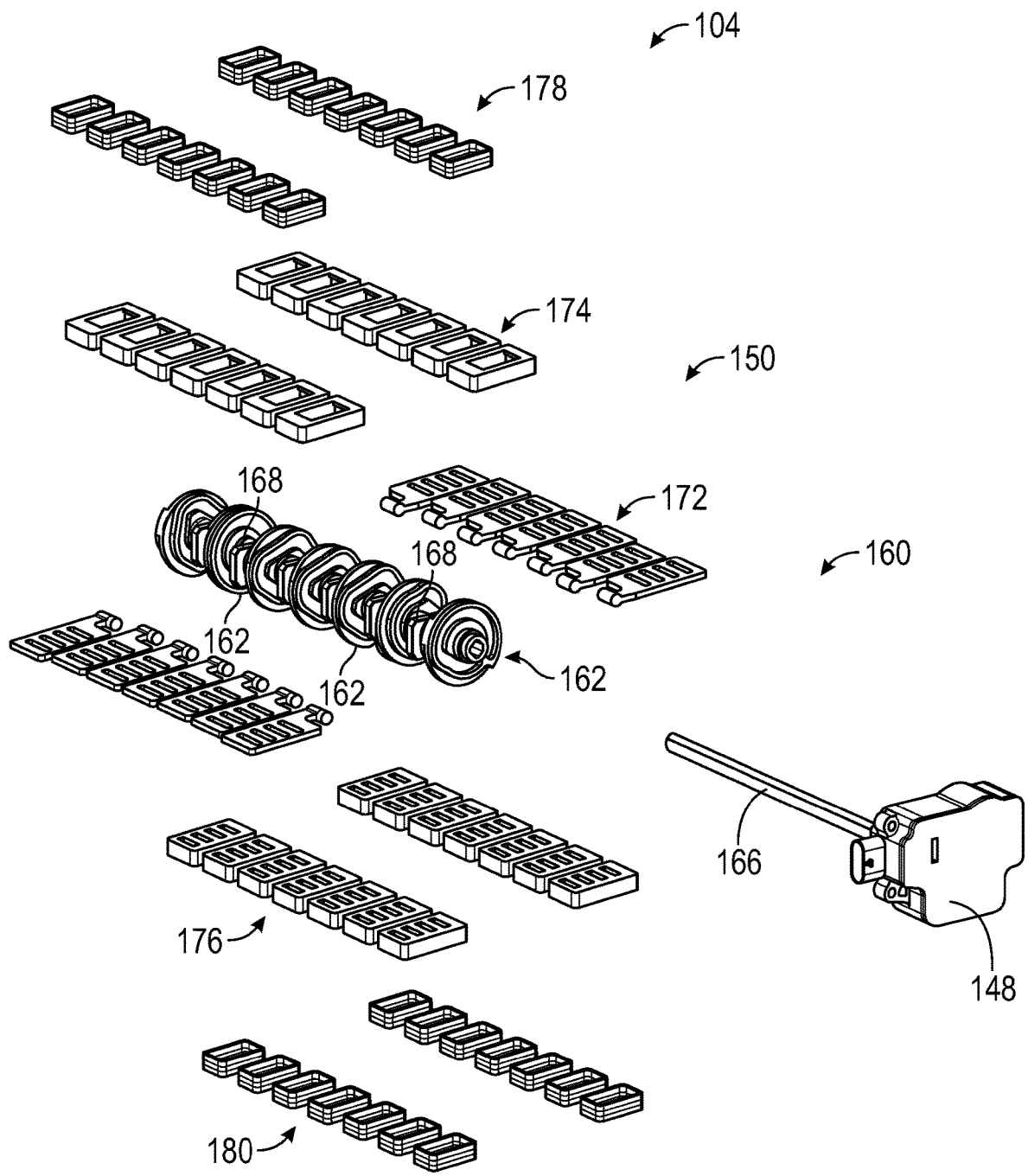
FIG. 7 is a top, front, right exploded perspective view of the flow control assembly of FIG. 6.
Figure 8:
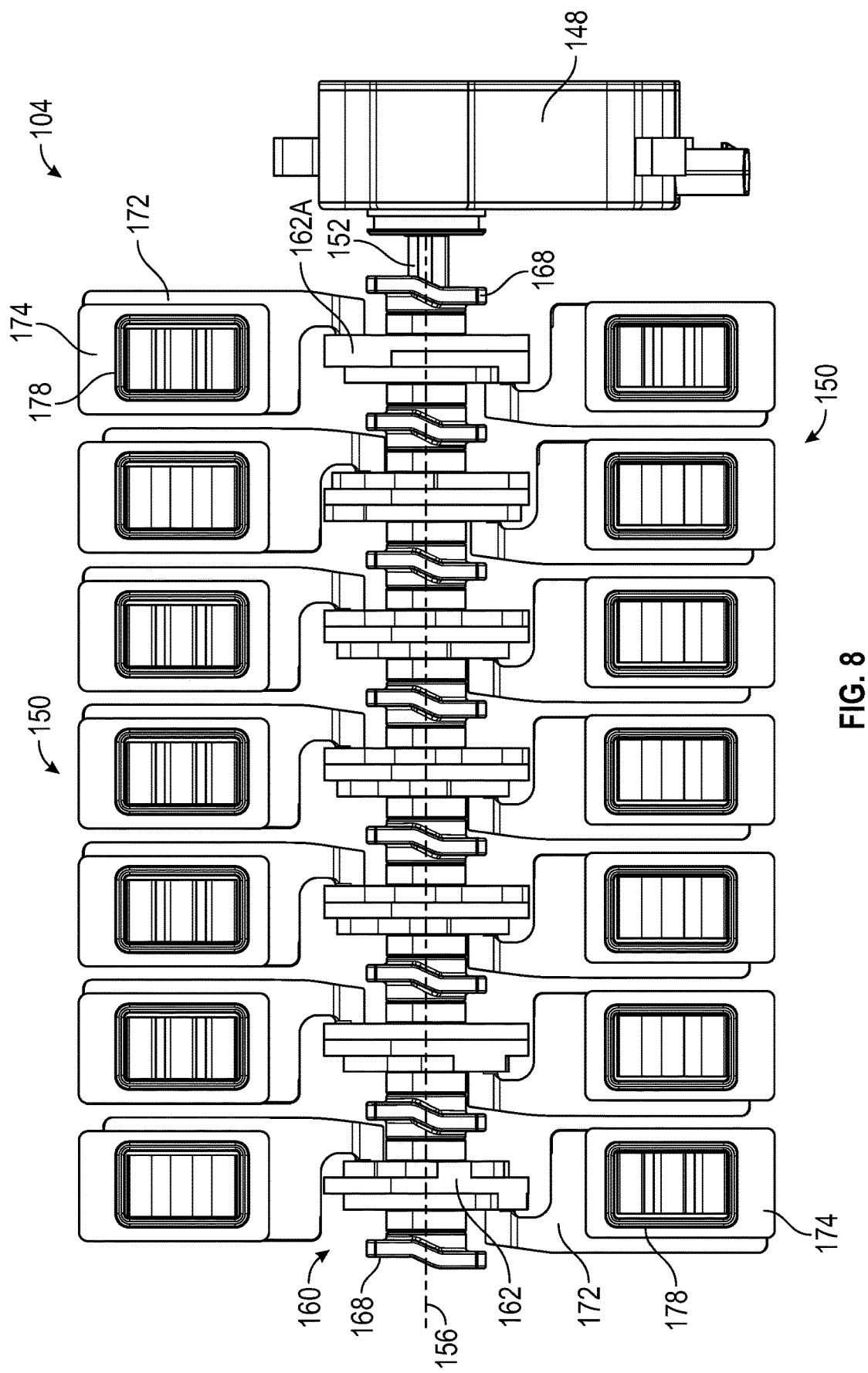
FIG. 8 is a top view of the flow control assembly of FIG. 6.
Figure 9:
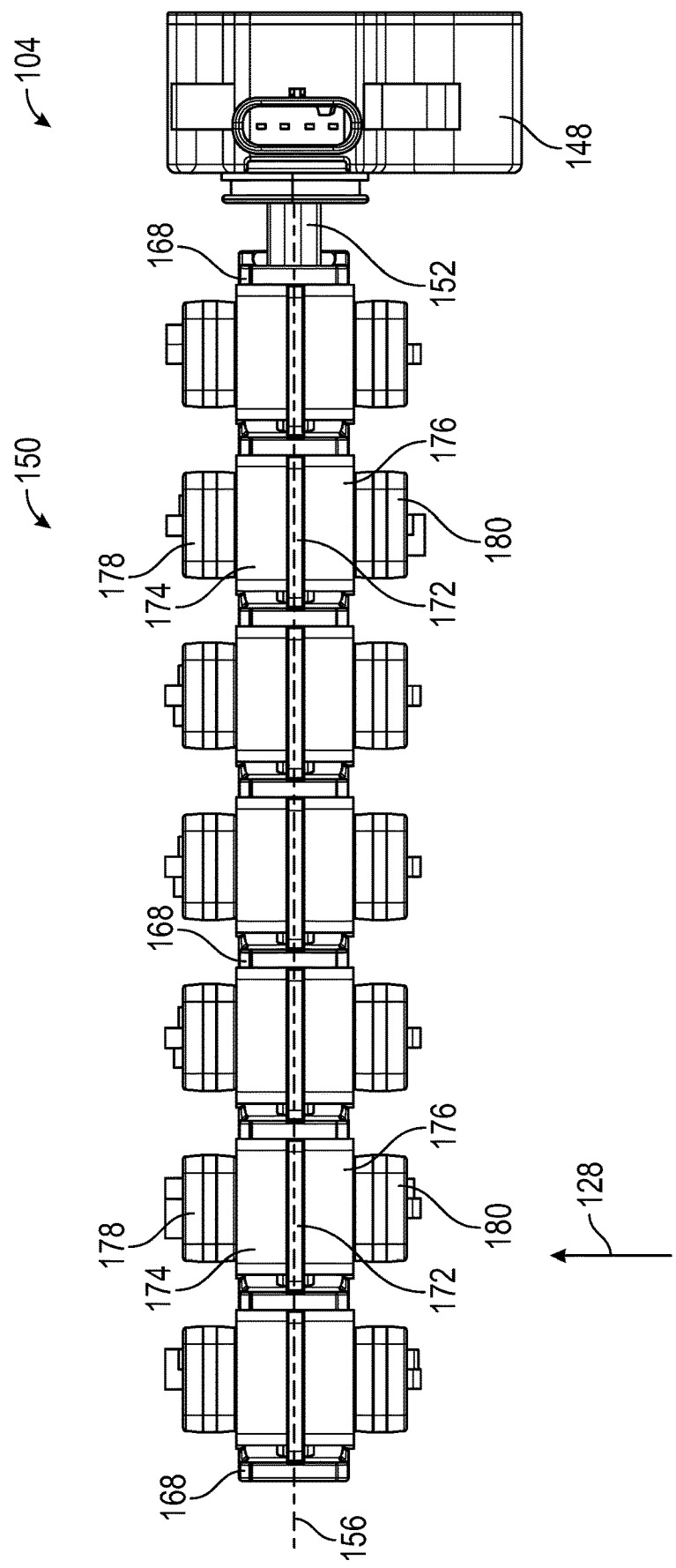
FIG. 9 is a right side view of the flow control assembly of FIG. 6.

With specific reference to FIG. 5, the drive shaft 152 extends into the housing assembly 102 at a location that is offset (e.g., in the stacking direction 128) from the second bonding interface 124 formed between the first housing section 106 and the second housing section 108. In other words, an entirety of the drive shaft 152 is offset from the second bonding interface 124 (e.g., in the stacking direction 128). This offset arrangement of the drive shaft 152 enables the second bonding interface 124 to maintain its coplanar orientation and the associated manufacturing advantages associated therewith. For example, the second bonding interface 124 extends linearly past the drive shaft 152 and the second bonding interface 124 is not required to form a seal around a split interface that curves around opposing sides of the drive shaft 152.

Turning to FIGS. 5-9, the flow control assembly 104 and the louver plate assemblies 150 are shown in more detail. Each of the louver plate assemblies 150 is coupled a cam 160 that is rotatably coupled to the drive shaft 152. In general, the cam 160 is configured to convert rotational motion of the drive shaft 152 into linear motion within the louver plate assemblies 150. The cam 160 includes a plurality of cam wheels 162 that are axially spaced along the drive axis 156. In the illustrated embodiment, the drive shaft 152 is rotatably coupled to one of the cam wheels 162 that is arranged axially closest to the drive shaft 152 (e.g., a first cam wheel 162A), and a cam shaft 166 extends axially through and is rotatably coupled to a remainder of the cam wheels 162 (see, e.g., FIG. 5). For example, the first cam wheel 162A is keyed to the drive shaft 152 so that rotation of the drive shaft 152 is directly transferred to rotation of the first cam wheel 164. In some embodiments, the first cam wheel 162A includes an axial bore that is geometrically keyed to an outer perimeter of the drive shaft 152 by both the axial bore and the outer perimeter defining a geometry that prevents relative rotation between the first cam wheel 162A and the drive shaft 152 (e.g., a triangular shape, a rectangular shape, a pentagonal shape, a hexagonal shape, or any other non-round shape that prevents relative rotation). Similarly, the cam shaft 166 is keyed to the first cam wheel 162A so that rotation of the first cam wheel 162A is directly transferred to rotation of the cam shaft 166 and thereby to a remainder of the cam wheels 162. Accordingly, all of the cam wheels 162 are rotatably coupled to the drive shaft 152 so that rotation of the drive shaft 152 is directly transferred (e.g., in a one-to-one ratio) to the cam wheels 162. In some embodiments, the flow control assembly 104 may not include the cam shaft 166 and the drive shaft 152 may extend axially through and be rotatably coupled to each of the cam wheels 162.

The flow control assembly 104 includes a plurality of bearings 168 spaced axially along the drive axis 156. In the illustrated embodiment, two of the bearings 168 are arranged on axially opposing sides of each of the cam wheels 162. In general, the bearings 168 support the drive shaft, 152, the cam wheels 162, and the cam shaft 166 between the first housing section 106 and the second housing section 108.

In the illustrated embodiment, each one of the cam wheels 162 is coupled to two of the louver plate assemblies 150, with the two louver plate assemblies 150 being arranged on radially opposite sides (e.g., separated by one hundred and eighty degrees) of the drive axis 156. Each assembly including a cam wheel 162 and two of the louver plate assemblies 150 may be defined as a flow control unit within the flow control assembly 104. In the illustrated embodiment, the flow control assembly 104 includes seven of the flow control units spaced axially along the drive axis 156 (e.g., seven cam wheels 162 and fourteen louver plate assemblies 150). The design and properties of the flow control assembly 104 within the thermal management control valve 100 enable the flow control units to be scaled up or down according to the thermal management requires of a particular electric vehicle. For example, the flow control assembly 104 may include any number (e.g., more or less than seven) of the flow control units spaced along the drive axis 156 to accommodate additional ports or thermal management components on an electric vehicle and/or to provide increased or decreased fluid flow to a particular port or thermal management component on an electric vehicle. Additionally, adding or removing the flow control units from the flow control assembly 104 does not increase the size of the housing assembly 102 along the stacking direction 128, so the scaling of the flow control units within the flow control assembly only affects the size of the housing assembly 102 along a single direction (e.g., axially along the drive axis 156).

In general, each of the cam wheels 162 includes a cam slot or track that converts rotational motion from the drive shaft 152 into linear motion within a respective one of the louver plate assemblies 150. In the illustrated embodiment, each of the cam wheels 162 includes two cam slots 170 that are axially recessed into axially-opposing sides of the cam wheel 162. For example, each of the cam wheels 162 includes a first cam slot 170A that is axially recessed into a first side of the cam wheel 162 and a second cam slot 170B that is axially recessed into an axially-opposite second side of the cam wheel 162 (see, e.g., FIG. 5). The inclusion of two cam slots 170 on each cam wheel 162 enables each of the cam wheels 162 to couple to two of the louver plate assemblies 150 (i.e., each louver plate assembly 150 is coupled to one of the cam slots 170). In some embodiments, each of the cam wheels 162 may include one cam slot 170 and the flow control assembly 104 may include one of the louver plate assemblies 150 couple to each of the cam wheels 162.

Figure 10:
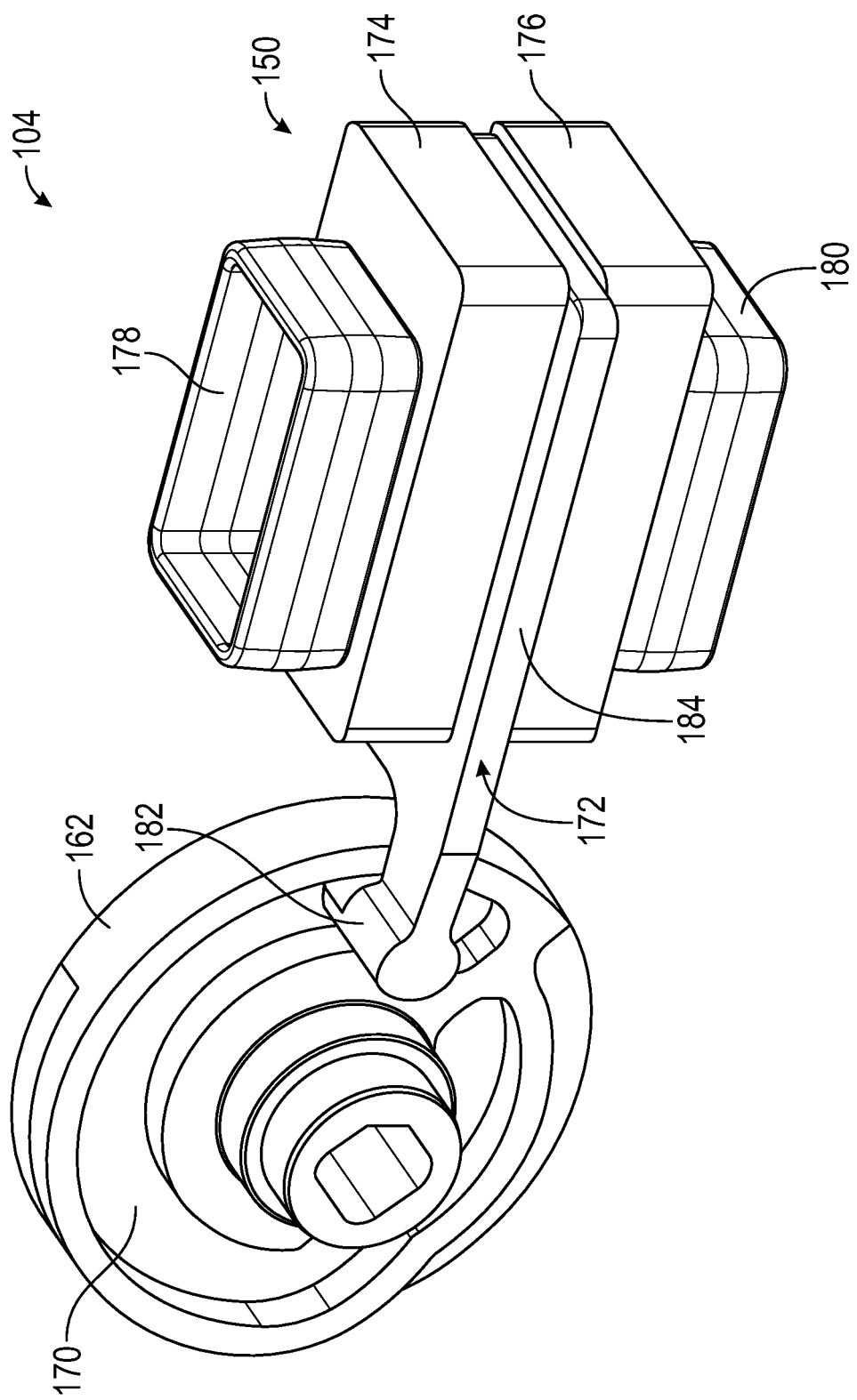
FIG. 10 is top, front, left perspective view of a louver plate assembly of the flow control assembly of FIG. 6.
Figure 11:
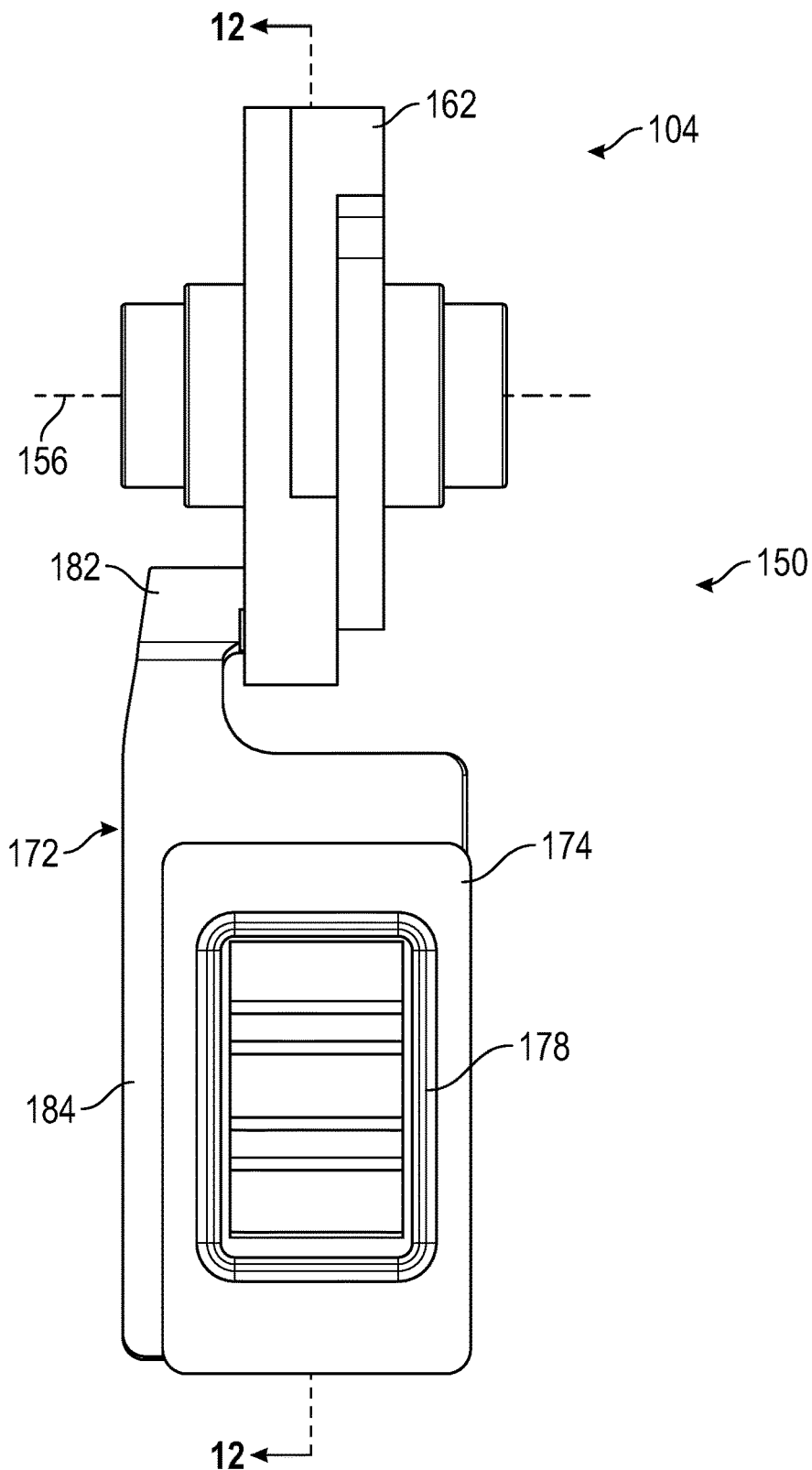
FIG. 11 is a top view of the louver plate assembly of FIG. 10.
Figure 12:
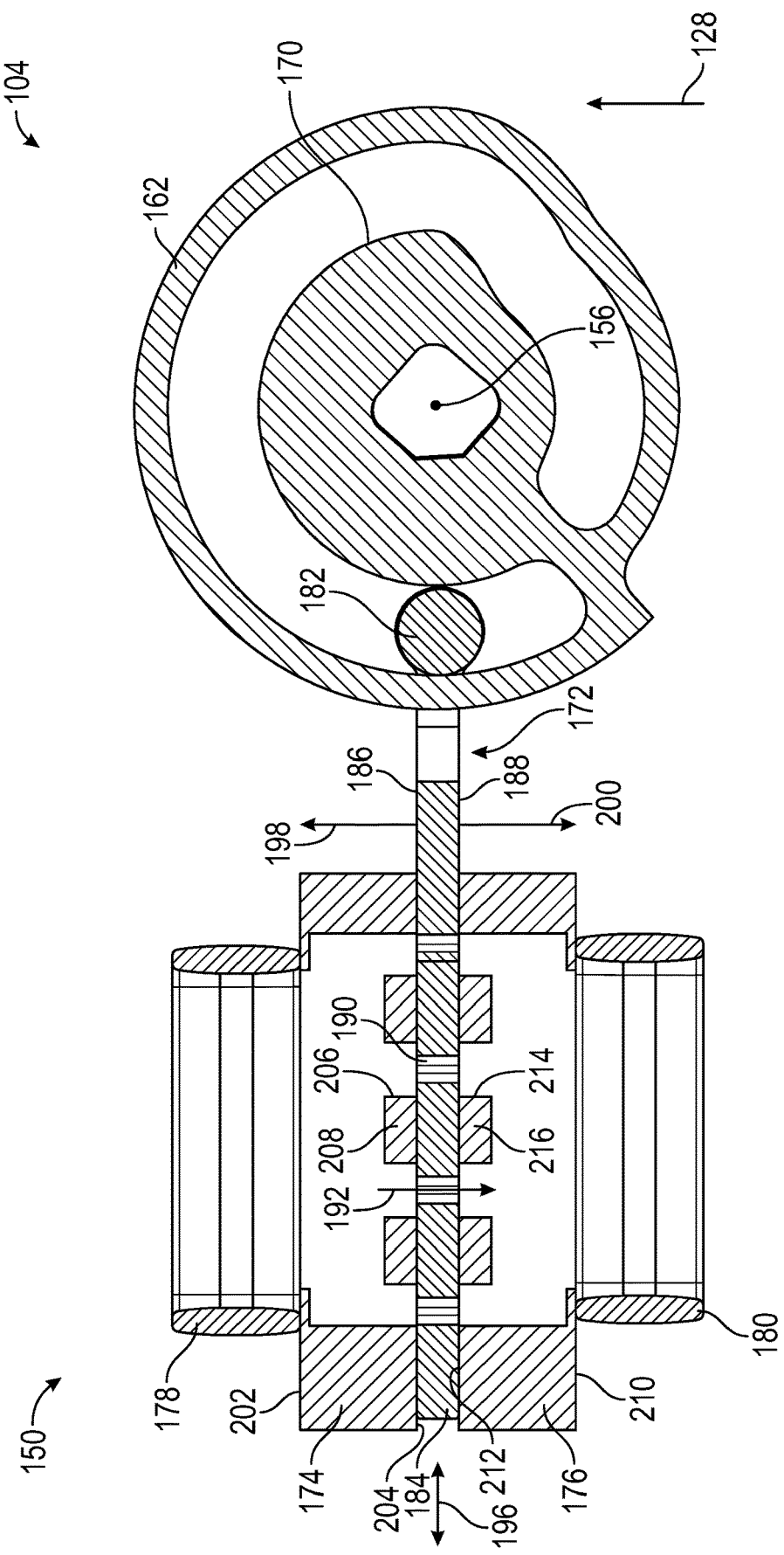
FIG. 12 is a cross-sectional view of the louver plate assembly of FIG. 11 taken along line 12-12.

In general, each of the louver plate assemblies 150 may include similar components and functionality, with like components identified with the same reference numerals, except as described herein or as apparent from the figures. It follows that the description of the louver plate assembly 150 illustrated in FIGS. 10-12 generally applies to each of the louver plate assemblies 150 of the flow control assembly 104. As illustrated in FIGS. 10-12, the louver plate assembly 150 includes a louver or flow plate 172, a first seal plate 174, a second seal plate 176, a first biasing element 178, and a second biasing element 180. In the illustrated embodiment, the louver plate 172 is coupled to and extends radially away from the cam wheel 162. The louver plate 172 includes a pin or bearing 182 and a louver body 184 that is coupled to the pin 182. At least a portion of the pin 182 extends axially into the cam slot 170 of the cam wheel 162 to couple the louver plate 172 to the cam wheel 162. The louver body 184 extends radially away from the cam wheel 162 and includes a first or upper louver surface 186, a second or lower louver surface 188, and a plurality of louver slots 190 (see, e.g., FIG. 12).

Each of the louver slots 190 extends through the louver plate 172. Specifically, each of the louver slots 190 extends completely through the louver body 184 (e.g., from the first louver surface 186 to the second louver surface 188) and defines a flow direction 192 through the louver plate 172. In some embodiments, the flow direction 192 may be defined along a centerline or center axis defined by the louver slots 190. In some embodiments, the flow direction 192 may be defined as being parallel to the slot walls that define the louver slots 190 and extend perpendicularly between the first louver surface 186 and the second louver surface 188. It should be appreciated that the flow direction 192 applies generally to the direction of fluid flow through the louver slots 190 in the louver plate 172 and the direction of fluid flow either entering or leaving the louver plate assembly 150 may or may not travel along the flow direction 192. Also, the exemplary illustration of the flow direction 192 extending downwardly (e.g., from the perspective of FIG. 12) is not meant to be limiting and the flow direction 192 may also extend upwardly (e.g., from the perspective of FIG. 12) depending on the configuration of the fluid chambers, ports, and thermal management component(s) that the louver plate assembly 150 is connected to. Regardless of whether or not the fluid flows upwardly or downwardly (e.g., from the perspective of FIG. 12), the flow direction 192 is always arranged perpendicular to both the drive axis 156 and a radial direction 196 defined relative to the drive axis 156 (see, e.g., FIG. 12).

In general, rotation of the cam wheel 162 may provide linear movement of the louver plate 172 along the radial direction 196. For example, during operation, the rotary actuator 148 selectively rotates the drive shaft 152 and the cam wheel 162 rotates with the drive shaft 152 so that the cam slot 170 rotates relative to the louver plate 172. The relative rotation between the cam slot 170 and the louver plate 172 results in the cam slot 170 moving circumferentially about the drive axis 156 and relative to the pin 182. As will be described herein, the cam slot 170 defines a geometry with a variable radius that, during rotation of the cam slot 170 relative to the pin 182, either maintains a position of the louver plate 172 along the radial direction 196 or moves the louver plate 172 (e.g., pushing or pulling) along the radial direction 196 so that (a) fluid flow is allowed through the louver slots 190 along the flow direction 192 (open position) or (b) fluid flow is inhibited through the louver slots 190 (closed position).

In the illustrated embodiment, the louver slots 190 are spaced along the radial direction 196 and extend in a direction generally parallel to the drive axis 156. In the illustrated embodiment, the louver plate 172 includes four of the louver slots 190. In some embodiments, the louver plate 172 may include more or less than four slots, for example, to alter the flow area provided through the louver plate 172.

In the illustrated embodiment, the first louver surface 186 defines a first surface normal 198 that extends normal from the first louver surface 186, and the second louver surface 188 defines a second surface normal 200 that extends normal from the second louver surface 188. The first surface normal 198 and the second surface normal 200 are arranged perpendicular to both of the drive axis 156 and the radial direction 196.

The first seal plate 174 is in engagement with the first louver surface 186 and includes a first or upper seal plate surface 202, a second or lower seal plate surface 204, and a first plurality of seal slots 206. The first seal plate surface 202 includes an opening, cutout, or aperture that extends through the first seal plate surface 202 and allows fluid to flow into or out of the first seal plate 174. The second seal plate surface 204 is in engagement with the first louver surface 186 so that a seal is formed therebetween. In some embodiments, the second seal plate surface 204 engages the first louver surface 186 to form a mechanical face seal between the second seal plate surface 204 and the first louver surface 186.

The first plurality of seal slots 206 extend in a direction parallel to the flow direction 192 and through the second seal plate surface 204. A bar or post 208 of the first seal plate 174 is formed between each radially adjacent pair of the seal slots 206. As will be described herein, during operation, the louver plate 172 is selectively moved along the radial direction 196 to (a) align each of the louver slots 190 with a respective one of the first plurality of seal slots 206 (see, e.g., FIG. 12) so that fluid flow is allowed through the louver plate 172 and the first seal plate 174 (open position), or (b) misalign the louver slots 190 and the first plurality of seal slots 206 so that each of the louver slots 190 is blocked by the first seal plate 174 (e.g., the louver slots 190 are blocked by the bars 208) and fluid flow is inhibited through the louver plate 172 and the first seal plate 174 (closed position).

The second seal plate 176 is in engagement with the second louver surface 188 and includes a first or lower seal plate surface 210, a second or upper seal plate surface 212, and a second plurality of seal slots 214. The first seal plate surface 210 includes an opening, cutout, or aperture that extends through the first seal plate surface 210 and allows fluid to flow into or out of the second seal plate 176. The second seal plate surface 212 is in engagement with the second louver surface 188 so that a seal is formed therebetween. In some embodiments, the second seal plate surface 212 engages the second louver surface 188 to form a mechanical face seal between the second seal plate surface 212 and the second louver surface 188.

The second plurality of seal slots 214 extend in a direction parallel to the flow direction 192 and through the second seal plate surface 212. A bar or post 216 of the second seal plate 176 is formed between each radially adjacent pair of the seal slots 214. As will be described herein, during operation, the louver plate 172 is selectively moved along the radial direction 196 to (a) align each of the louver slots 190 with a respective pair of seal slots that includes one of the first plurality of seal slots 206 and one of the second plurality of seal slots 214 that are aligned along the flow direction 192 (see, e.g., FIG. 12) so that fluid flow is allowed through the louver plate 172 (open position), or (b) misalign the louver slots 190 with both the first plurality of seal slots 206 and the second plurality of seal slots 214 so that each of the louver slots 190 is blocked by the first seal plate 174 and the second seal plate 176 (e.g., the louver slots 190 are blocked by the bars 208 and the bars 216) and fluid flow is inhibited through the louver plate 172 (closed position).

In some embodiments, the first seal plate 174 and the second seal plate 176 are fabricated from a plastic material, a polymer material, or a rubber material. In some embodiments, the first biasing element 178 and the second biasing element 180 are fabricated from a plastic material, a polymer material, or a rubber material. In some embodiments, the first biasing element 178 and the second biasing element 180 are press-in-place seals. In some embodiments, the first biasing element 178 and the second biasing element 180 are fabricated from a material with a low durometer value (e.g., between about Shore A 40 and about Shore A 60).

The first biasing element 178 is in engagement with the first seal plate surface 202 so that the first biasing element 178 biases the first seal plate 174 in a direction toward the louver plate 172. In this way, for example, the first biasing element 178 aids in maintaining the seal between the second seal plate surface 204 of the first seal plate 174 and the first louver surface 186 of the louver plate 172. In some embodiments, the first biasing element 178 may be in the form of an elastic gasket, a plastic gasket, a spring, or an equivalent structure that is configured to apply a biasing force on the first seal plate 174.

The second biasing element 180 is in engagement with the first seal plate surface 210 so that the second biasing element 180 biases the second seal plate 176 in a direction toward the louver plate 172. In this way, for example, the second biasing element 180 aids in maintaining the seal between the second seal plate surface 212 of the second seal plate 176 and the second louver surface 188 of the louver plate 172. In some embodiments, the second biasing element 180 may be in the form of an elastic gasket, a plastic gasket, a spring, or an equivalent structure that is configured to apply a biasing force on the second seal plate 176.

In some embodiments, the louver plate assembly 150 includes components that are stacked along the stacking direction 128 during manufacture. For example, the interfaces formed between the engaging surfaces of the louver plate 172, the first seal plate 174, the second seal plate 176, the first biasing element 178, and the second biasing element 180 are spaced along the stacking direction 128. In some embodiments, the flow direction 192 and/or the surface normals 198, 200 may be parallel to the stacking direction 128. In the illustrated embodiment, the louver plates 172 of the louver plate assemblies 150 are arranged coplanar. For example, the first louver surfaces 186 in each of the louver plate assemblies 150 are arranged coplanar (see, e.g., FIG. 9). Similarly, the second louver surfaces 188 in each of the louver plate assemblies 150 are arranged coplanar. In other words, the flow control assembly 104 includes a first louver plate 172 and a second louver plate 172 that both include a louver surface (e.g., the first louver surface 186 or the second louver surface 188), with the louver surfaces being coplanar. In general, arranging each of the louver plates 172 in a coplanar arrangement ensures that each of the louver plates 172 actuate or move along a common direction (i.e., parallel to the radial direction 196). Additionally, each of the louver plates 172 engages a respective one of the cam wheels 162 (e.g., at a pressure point) that is generally aligned with the drive axis 156, which aids in reducing the actuation force required to move the louver plates 172 by reducing moments generated on the drive shaft 152 and, thereby, reduces the power output requirements for the rotary actuator 148 (e.g., when compared to conventional thermal management control valves). In addition, the coplanar arrangement improves the manufacturability of the thermal management control valve 100 (e.g., when compared to conventional thermal management control valves) by contributing to the ability of the thermal management control valve to be sequentially built along the stacking direction 128 without requiring components to be inserted into or assembled within preassembled housings (e.g., within preformed internal cavities, etc.), and by making the components of the thermal management control valve 100 easily moldable.

As described herein, the cam slots 170 define a geometry with a variable radius that, during rotation of the cam slot 170 relative to the pin 182, either maintains a position of the louver plate 172 along the radial direction 196 or moves the louver plate 172 (e.g., pushing or pulling) along the radial direction 196. In general, each of the cam slots 170 in the flow control assembly 104 may be designed with a radial profile that corresponds with a predefined movement profile for a respective one of the louver plates 172 that is based on a rotary position of the rotary actuator 148. In this way, for example, each of the louver plates 172 can be selectively held in its current position (e.g., the open position or the closed position) based on a rotary position of the drive shaft 152 during operation, or moved between the open position and the closed position based on the rotary position of the drive shaft 152 during operation of the thermal management control valve 100.

Turning to FIGS. 13-16, the cam slot 170 may be designed to include a radial profile with a radius (e.g., relative to the drive axis 156) that varies in at least one section of the cam slot 170. It should be appreciated that the cam slots 170 illustrated in FIGS. 13-16 are not meant to be limiting and the cam slots 170 may be designed to include any radial profile to accommodate a particular thermal management application (i.e., opening and closing of the louver plates 172 for a particular duration at a particular time). Also, the cam slots 170 illustrated in FIGS. 13-16 may be included on the first cam slot 170A and/or the second cam slot 170B of the cam wheels 162. In some embodiments, the first cam slot 170A and the second cam slot 170B define the same radial profile. In some embodiments, the first cam slot 170A and the second cam slot 170B define a different radial profile. In some embodiments, a first subset of the cam wheels 162 include the same radial profile on the first cam slot 170A and the second cam slot 170B, and a second subset of the cam wheels 162 include a different radial profile on the first cam slot 170A and the second cam slot 170B.

In the illustrated embodiment of FIG. 13, the cam wheel 162 includes a cam slot 170 that extends circumferentially around the drive axis 156. The cam slot 170 includes a first or inner side surface 218 and a second or outer side surface 220. The cam slot 170 defines a first portion 222 at a first circumferential position that extends a first radial distance 224 from the drive axis 156 and a second portion 226 at a second circumferential position that extends a second radial distance 228 from the drive axis 156. In the illustrated embodiment, the first radial distance 224 and the second radial distance 228 are defined between the drive axis 156 and the first side surface 218 of the cam slot 170. In some embodiments, the radial distance that the cam slot 170 extends relative to the drive axis 156 may be defined between the drive axis 156 and the second side surface 220, or between the drive axis 156 and a centerline along the cam slot 170 (e.g., radially between the first side surface 218 and the second side surface 220). In the illustrated embodiment, the first radial distance 224 is less than the second radial distance 228. In general, the transition between the first radial distance 224 and the second radial distance 228 (and vice versa) results in the pin 182 of the louver plate 172 being pushed or pulled along the radial direction 196, and the louver plate 172 is moved between the open position and the closed position (or vice versa). In some embodiments, a difference between the first radial distance 224 and the second radial distance 228 corresponds with a travel distance of the louver plate 172. Accordingly, the cam slot 170 may include various transitions between the first radial distance 224 and the second radial distance 228 along the cam slot 170 to trigger movement of the louver plate 172 a predetermined distance along the radial direction 196. In addition, a slope defined by a ramp between the first radial distance 224 and the second radial distance 228 may define how quickly the louver plate 172 moves along the radial direction 196 when transitioning between the open position and the closed position (or vice versa).

With continued reference to FIG. 13, the first portion 222 extends a first circumferential distance 230 along the cam slot 170 and the second portion 226 extends a second circumferential distance 232 along the cam slot 170. In the illustrated embodiment, the first circumferential distance 230 is less than the second circumferential distance 232. According to an exemplary embodiment, the first portion 222 corresponds with the louver plate 172 being in the closed position and the second portion 226 corresponds with the louver plate 172 being in the open position. In this embodiment, when the rotary actuator 148 positions the pin 182 along the first circumferential distance 230, the louver plate 172 is in the closed position, and when the rotary actuator 148 positions the pin 182 along the second circumferential distance 232, the louver plate 172 is in the open position. Accordingly, the cam slot 170 may be designed to include any number of portions that change in radial distance to define any number of circumferential distances/positions that correspond with the louver plate 172 being in the open position or the closed position.

In the illustrated embodiment of FIG. 14, the cam slot 170 includes a first portion 234, a second portion 236, a third portion 238, and a fourth portion 240, each being spaced at different circumferential positions along the cam slot 170. The first portion 234 extends a first radial distance 242 from the drive axis 156 and a first circumferential distance 244 around the drive axis 156. The second portion 236 extends a second radial distance 246 from the drive axis 156 and a second circumferential distance 248 around the drive axis 156. The third portion 238 extends a third radial distance 250 from the drive axis 156 and a third circumferential distance 252 around the drive axis 156. The fourth portion 240 extends a fourth radial distance 254 from the drive axis 156 and a fourth circumferential distance 256 around the drive axis 156. In the illustrated embodiment, the first radial distance 242 is about equal to the third radial distance 250, and the second radial distance 246 is about equal to the fourth radial distance 254. The first radial distance 242 is greater than both the second radial distance 246 and the fourth radial distance 254. The first circumferential distance 244 is about equal to the third circumferential distance 252, and the second circumferential distance 248 is about equal to the fourth circumferential distance 256. The first circumferential distance 244 is less than both the second circumferential distance 248 and the fourth circumferential distance 256.

In the illustrated embodiment of FIG. 15, the cam slot 170 includes a first portion 258, a second portion 260, and a third portion 262, each being spaced at different circumferential positions along the cam slot 170. The first portion 258 extends a first radial distance 264 from the drive axis 156 and a first circumferential distance 266 around the drive axis 156. The second portion 260 extends a second radial distance 268 from the drive axis 156 and a second circumferential distance 270 around the drive axis 156. The third portion 262 extends a third radial distance 272 from the drive axis 156 and a third circumferential distance 274 around the drive axis 156. In the illustrated embodiment, the first radial distance 264 and the third radial distance 272 are about equal. The second radial distance 268 is greater than both of the first radial distance 264 and the third radial distance 272. The first circumferential distance 266 is greater than both of the second circumferential distance 270 and the third circumferential distance 274, and the second circumferential distance 270 is greater than the third circumferential distance 274.

In the illustrated embodiment of FIG. 16, the cam slot 170 includes a first portion 276, a second portion 278, a third portion 280, and a fourth portion 282, each being spaced at different circumferential positions along the cam slot 170. The first portion 276 extends a first radial distance 284 from the drive axis 156 and a first circumferential distance 286 around the drive axis 156. The second portion 278 extends a second radial distance 288 from the drive axis 156 and a second circumferential distance 290 around the drive axis 156. The third portion 280 extends a third radial distance 292 from the drive axis 156 and a third circumferential distance 294 around the drive axis 156. The fourth portion 282 extends a fourth radial distance 296 from the drive axis 156 and a fourth circumferential distance 298 around the drive axis 156. In the illustrated embodiment, the first radial distance 284 is about equal to the third radial distance 292, and the second radial distance 288 is about equal to the fourth radial distance 296. The first radial distance 284 is less than both of the second radial distance 288 and the fourth radial distance 296. The third circumferential distance 294 is less than all of the first circumferential distance 286, the second circumferential distance 290, and the fourth circumferential distance 298. The second circumferential distance 290 is less than both of the first circumferential distance 286 and the fourth circumferential distance 298, and the first circumferential distance 286 is less than the fourth circumferential distance 298.

In general, the cam slots 170 of the flow control assembly 104 may be designed to accommodate any opening and closing sequence required by a particular thermal management component. For example, any of the cam slots 170 illustrated in FIGS. 13-16 may be rotated circumferentially about the drive axis 156 to define a different initial position, and thereby a different sequence of opening and closing positions for a given rotational position of the cam wheel 162. That is, a similar design of the cam slot 170 may be rotationally offset to change how a louver plate 172 opens and closes in response to rotation by the rotary actuator 148. Additionally, the design of the cam slot 170 may also be changed as described herein to vary how a louver plate 172 opens and closes in response to rotation by the rotary actuator 148.

Figure 17:
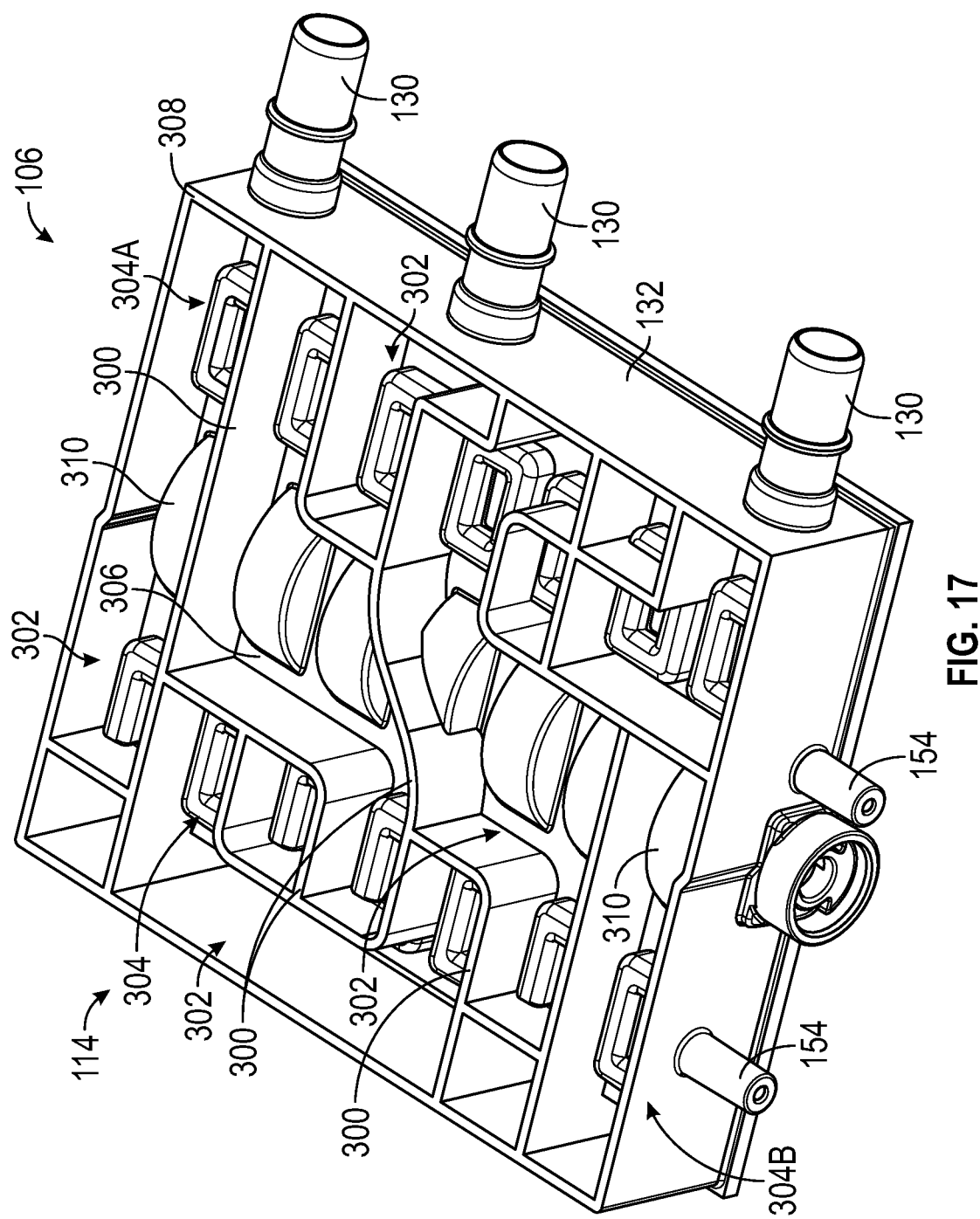
FIG. 17 is a top, front, left perspective view of a first housing section of the thermal management control valve of FIG. 1.
Figure 18:
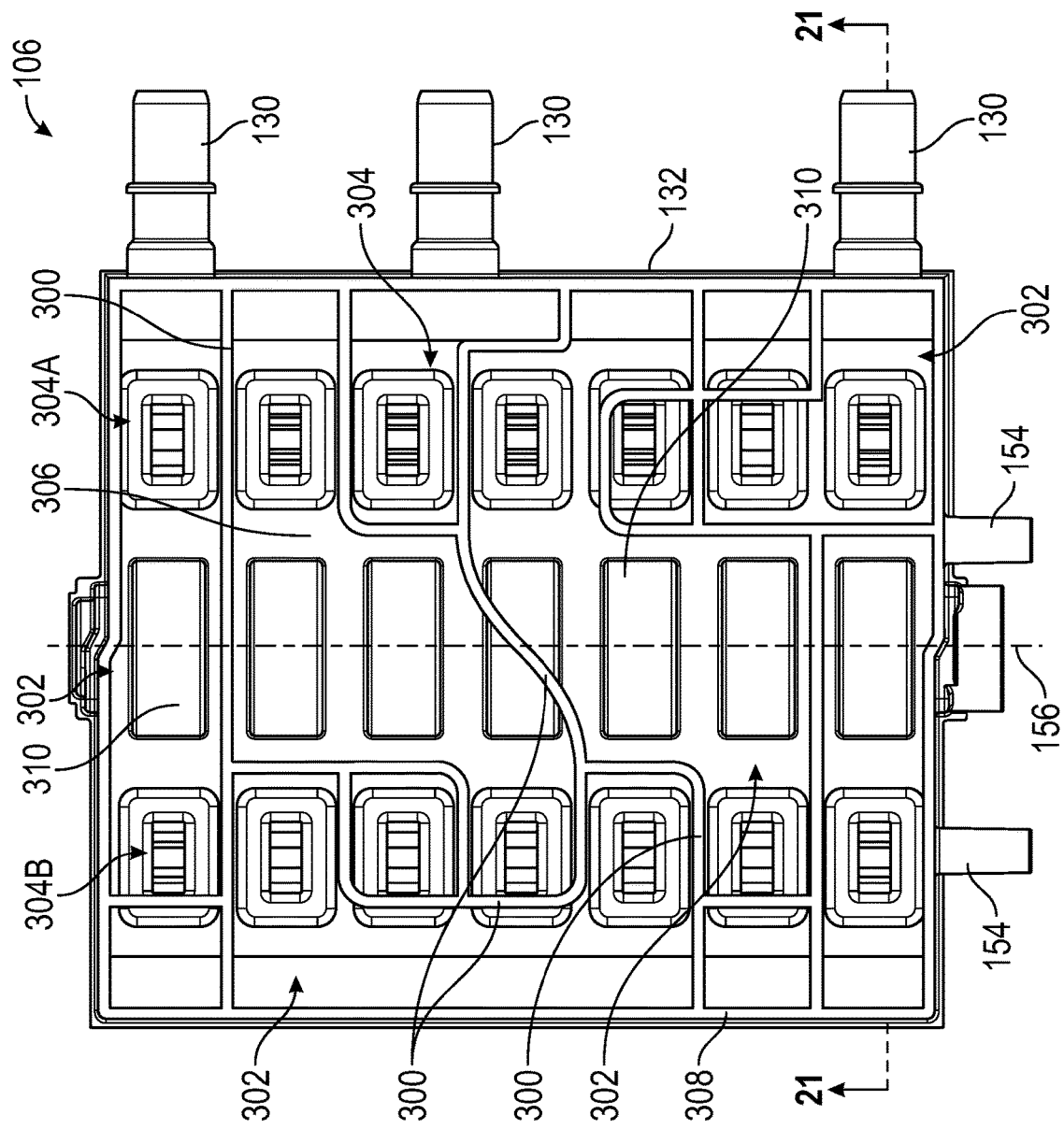
FIG. 18 is a top view of the first housing section of FIG. 17.

Turning to FIGS. 17 and 18, the first housing section 106 includes a plurality of first internal walls 300, a plurality of first fluid chambers 302, a plurality of first louver cutouts or ports 304, a base wall 306, a perimeter wall 308, a plurality of first cam protrusions 310. In general, each of the plurality of first fluid chambers 302 is at least partially formed by one or more of the first internal walls 300 and/or the perimeter wall 308. When the housing assembly 102 is assembled, each of the plurality of first fluid chambers 302 forms an enclosure around one or more of the first louver ports 304. For example, the first housing cover 110 may combine with the first internal walls 300 and/or the perimeter wall 308 to form the first fluid chambers 302, each of which encloses one or more of the first louver ports 304.

In the illustrated embodiment, the plurality of first internal walls 300 extend upwardly from the base wall 306 (e.g., in a direction parallel to the stacking direction 128). In the illustrated embodiment, the first internal walls 300 form different configurations for the first fluid chambers 302 that provide different flow areas (e.g., more or less of the first louver ports 304 may be connected to increase or decrease a flow area), flow paths, and connections to the ports 130, 136, 142. For example, at least one of the first fluid chambers 302 is in fluid communication with only one of the first louver ports 304. In some embodiments, at least one of the first fluid chambers 302 connects two or more of the first louver ports 304. In some embodiments, at least one of the first fluid chambers 302 connects two or more of the first louver ports 304 that are arranged on the same radial side of the drive axis 156 and axially spaced from one another. In some embodiments, at least one of the first fluid chambers 302 connects two of the first louver ports 304 that are arranged on radially-opposing sides of the drive axis 156 and are axially aligned. In some embodiments, at least one of the first fluid chambers 302 connects two of the first louver ports 304 that are arranged on radially-opposing sides of the drive axis 156 and are axially spaced. In some embodiments, at least one of the first fluid chambers 302 connects one or more of the first louver ports 304 on a first radial side of the drive axis 156 with one or more of the first louver ports 304 on a second radial side of the drive axis 156 that is opposite to the first radial side.

In the illustrated embodiment, the plurality of first louver ports 304 includes a first set of first louver ports 304A that are radially aligned on a first radial side of the drive axis 156 and are axially spaced from one another, and a second set of first louver ports 304B that are radially aligned on a second radial side of the drive axis 156 and are axially spaced from one another. When the thermal management control valve 100 is assembled, each of the first louver ports 304 is aligned with a respective one of the louver plates 172 so that fluid communication is provided between the first louver port 304 and the louver plate 172.

Each of the plurality of first cam protrusions 310 extends outwardly from (e.g., upward from the perspective of FIG. 17) the base wall 306. In the illustrated embodiment, each of the first cam protrusions 310 defines a generally half-cylindrical shape. As will be described herein, each of the first cam protrusions 310 forms a first cam recess 312 (see, e.g., FIG. 21) that defines a generally half-cylindrical shape in the first housing section 106, each of which receives at least a portion of a respective one of the cam wheels 162 (see, e.g., FIG. 27). In the illustrated embodiment, the first cam protrusions 310 are axially aligned along the drive axis 156 and axially spaced from one another along the drive axis 156.

Figure 19:
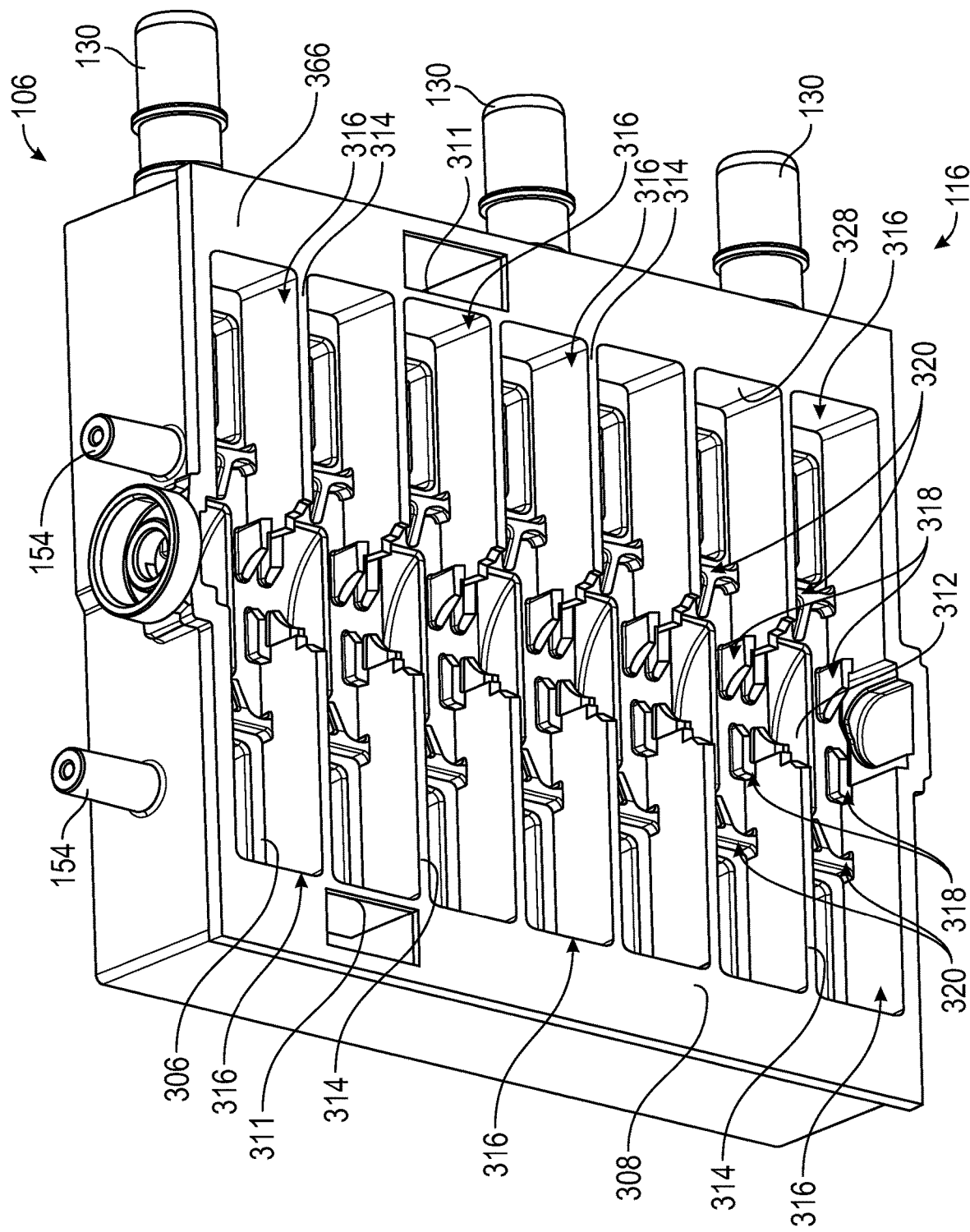
FIG. 19 is a bottom, front, right perspective view of the first housing section of FIG. 17.
Figure 20:
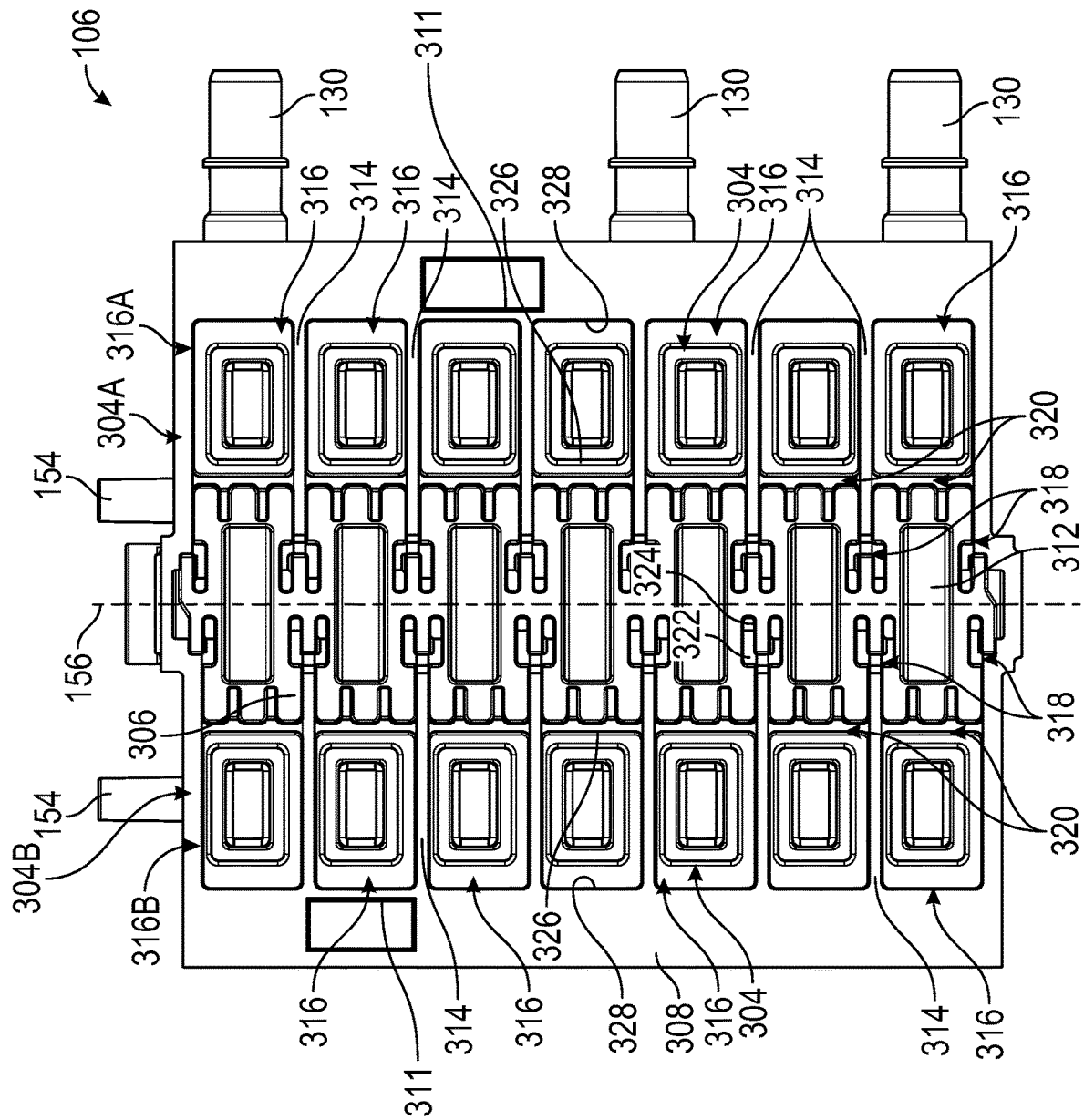
FIG. 20 is a bottom view of the first housing section of FIG. 17.
Figure 21:
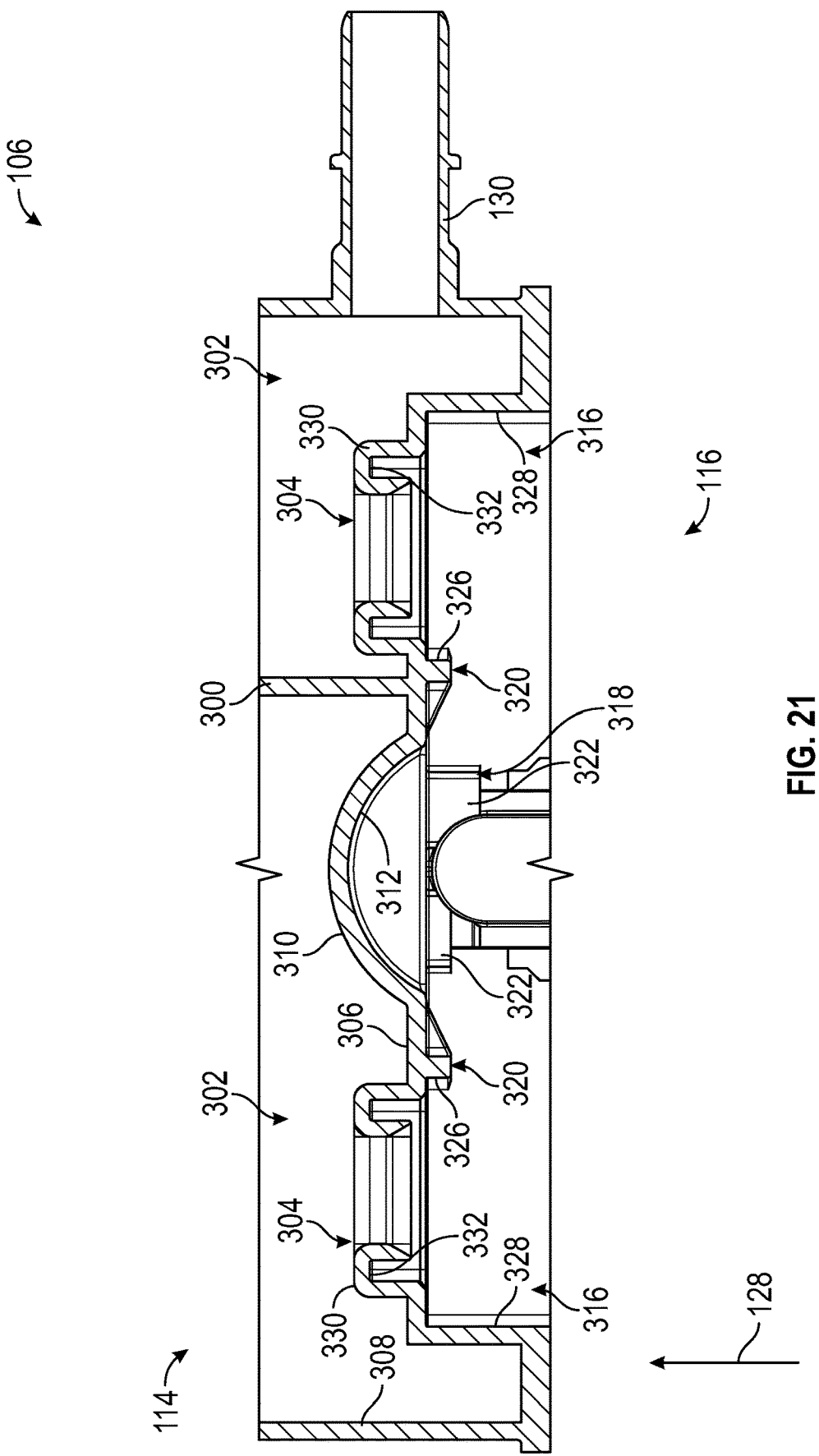
FIG. 21 is a cross-sectional view of the first housing section of FIG. 18 taken along line 21-21.

Turning to FIGS. 19-21, the first housing section 106 includes a plurality of second internal walls 314, a plurality of first louver chambers 316, a plurality of first bearing supports 318, and a plurality of first seal plate supports 320. Each of the second internal walls 314 extends outwardly from the base wall 306 in a direction opposite to the first internal walls 300. That is, the first internal walls 300 extend from the base wall 306 in a direction toward the first side 114 of the first housing section 106 and the second internal walls 314 extend from the base wall 306 in a direction toward the second side 116 of the first housing section 106 (see, e.g., FIG. 21). The second internal walls 314 separate axially-adjacent pairs of the first louver chambers 316. For example, each of the first louver chambers 316 may be at least partially formed by two or more of the second internal walls 314.

In the illustrated embodiment, the plurality of first louver chambers 316 includes a first set of first louver chambers 316A that are radially aligned on a first radial side of the drive axis 156 and are axially spaced from one another, and a second set of first louver chambers 316 that are radially aligned on a second radial side of the drive axis 156 and are axially spaced from one another. When the thermal management control valve 100 is assembled, each of the first louver chambers at least partially receives a respective one of the louver plate assemblies 150.

In the illustrated embodiment, each of the first cam recesses 312 is arranged between (e.g., in a direction parallel to the radial direction 196) a respective pair of the first louver ports 304, and a pair of the first bearing supports 318 is arranged on axially-opposite sides of each of the first cam recesses 312. Each of the first bearing supports 318 includes two opposing first bearing walls 322 that extend downwardly (e.g., toward the second side 116 of the first housing section 106) from the base wall 306. Each of the first bearing walls 322 is U-shaped and defines a first bearing channel 324 that receives at least a portion of a respective one of the bearings 168 to axially secure the bearing 168.

In the illustrated embodiment, each of the first seal plate supports 320 extends axially along a respective one of the first louver chambers 316 and is arranged between (e.g., in a direction parallel to the radial direction 196) a respective one of the first cam recesses 312 and a respective one of the first louver ports 304. Each of the first seal plate supports 320 extends downwardly (e.g., in a direction toward the second side 116 of the first housing section 106) from the base wall 306 and includes a first seal surface 326. In the illustrated embodiment, each of the first louver chambers 316 includes a second seal surface 328 that opposes (e.g., in a direction parallel to the radial direction 196) the first seal surface 326. During assembly of the thermal management control valve 100, each of the first seal plates 174 is inserted into a respective one of the first louver chambers 316 so that the first seal plate 174 is arranged between (e.g., in a direction parallel to the radial direction 196) the first seal surface 326 and the second seal surface 328. During operation, the first seal surface 326 and the second seal surface 328 act to contain the first seal plate 174 and prevent the first seal plate 174 from moving with the louver plate 172 along the radial direction 196.

In the illustrated embodiment, the first housing section 106 includes one or more first pass-through ports 311 that are arranged laterally outwardly relative to the first louver chambers 316. Each of the first pass-through ports 311 extends through a bottom surface 366 of the first housing section 106. As described herein, each of the first pass-through ports 311 is arranged to align with a respective pass-through port in the second housing section 106 to form a pass-through passage that extends through the housing assembly 102.

With specific reference to FIG. 21, each of the first louver ports 304 is formed by a port wall 330 that extends upwardly (e.g., in a direction toward the first side 114) from the base wall 306. In the illustrated embodiment, each of the port walls 330 is U-shaped and defines a first biasing channel 332. During assembly of the thermal management control valve 100, each of the first biasing channels 332 receives a respective one of the first biasing elements 178 therein.

In general, the first housing section 106 may be designed to include any configuration of the first internal walls 300 to design a particular set of fluid chambers that accommodate the flow requirements (e.g., flow area, porting configurations, etc.) for a specific arrangement of thermal management components. Because the first housing section 106 is fabricated by an injection molding process, the design, number, and arrangement of the first internal walls 300, and the corresponding first fluid chambers 302 formed thereby, may be easily changed by modifying the design that is used to manufacture the first housing section 106. Additionally, the axial length of the first housing section 106 may be increased or decreased to accommodate more or less of the flow control units (e.g., the cam wheels 162 and the corresponding louver plate assemblies 150 coupled thereto). Further, the pass-through ports 311 may be easily formed in the first housing section 306 and connect with pass-through ports formed in the second housing section 108 to form pass-through passages within the housing assembly 102.

Figure 22:
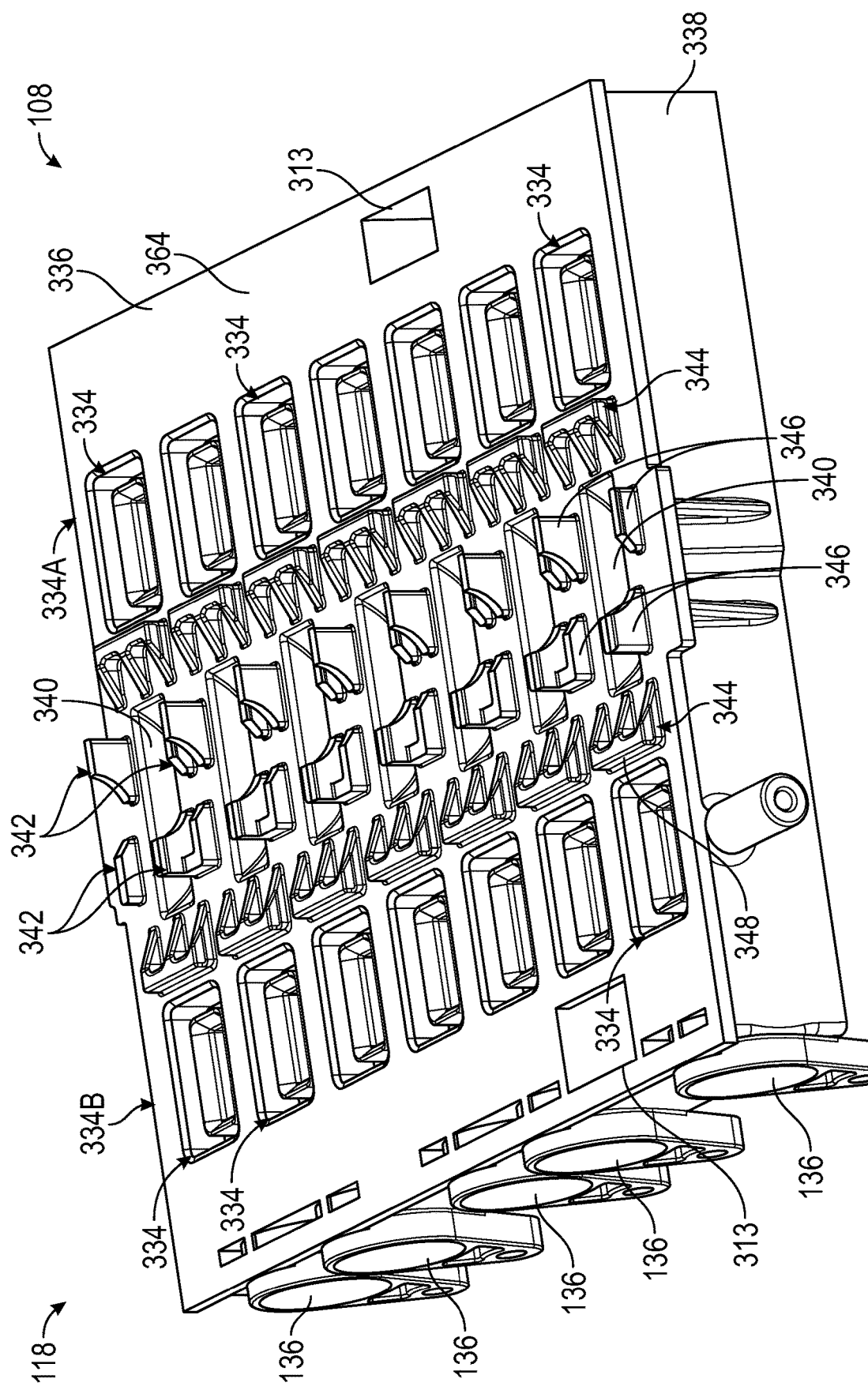
FIG. 22 is a is a top, front, right perspective view of a second housing section of the thermal management control valve of FIG. 1.
Figure 23:
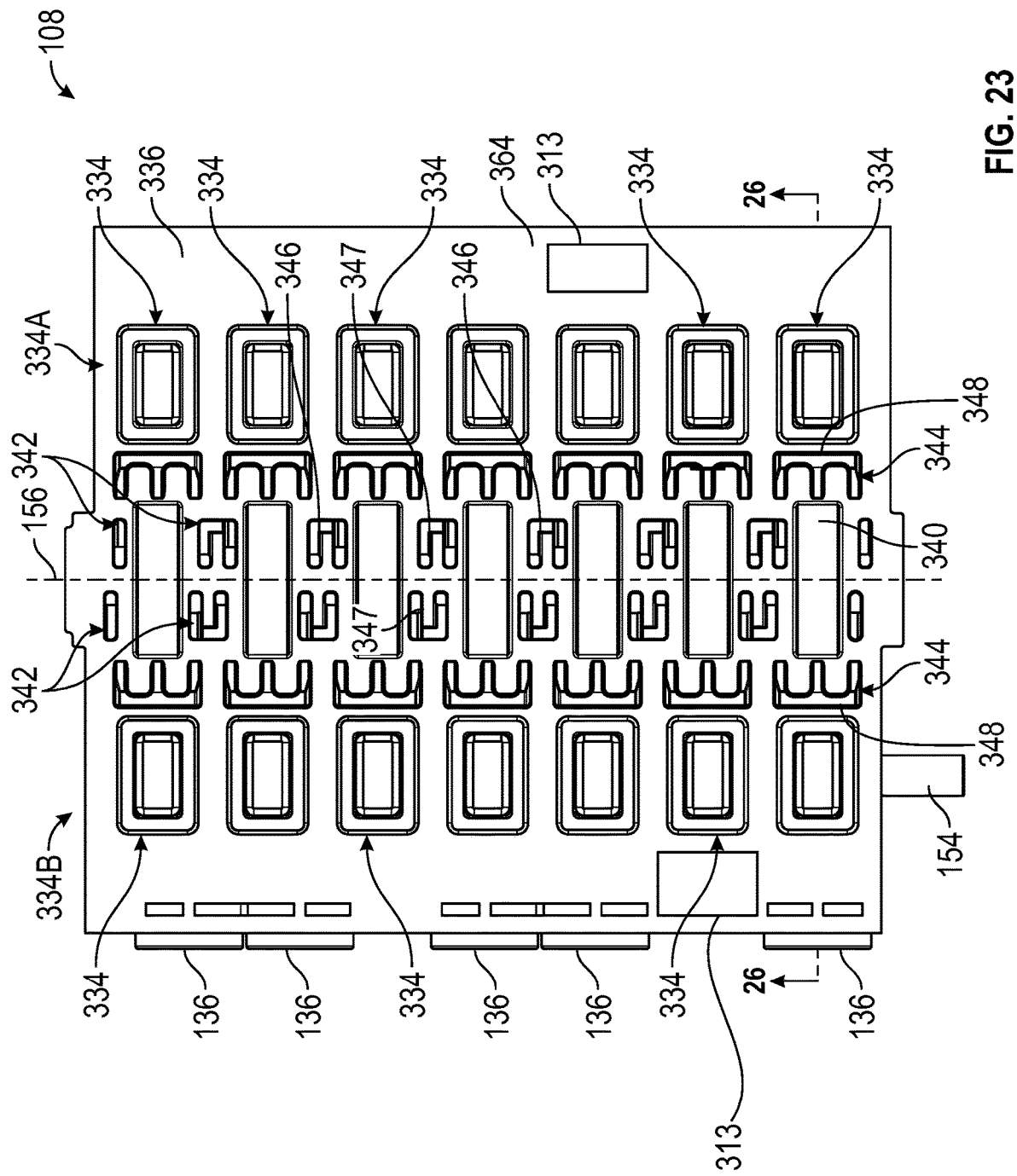
FIG. 23 is a top view of the second housing section of FIG. 22.

In general, the second housing section 108 includes features that are complementary to the first housing section 106. For example, the second housing section 108 may include features that are complementary to the first louver ports 304, the first cam recesses 312, the first bearing supports 318, and the first seal plate supports 320. Turning to FIGS. 22 and 23, the second housing section 108 includes a plurality of second louver ports 334, a base wall 336, a perimeter wall 338, a plurality of second cam recesses 340, a plurality of second bearing supports 342, and a plurality of second seal plate supports 344. In the illustrated embodiment, the plurality of second louver ports 334 include a first set of second louver ports 334A that are aligned on a first radial side of the drive axis 156 and are axially spaced from one another, and a second set of second louver ports 334B that are aligned on a second radial side of the drive axis 156 and are axially spaced from one another. When the thermal management control valve 100 is assembled, each of the second louver ports 334 is aligned with a respective one of the louver plates 172 so that fluid communication is provided between the second louver port 334 and the louver plate 172.

Figure 27:
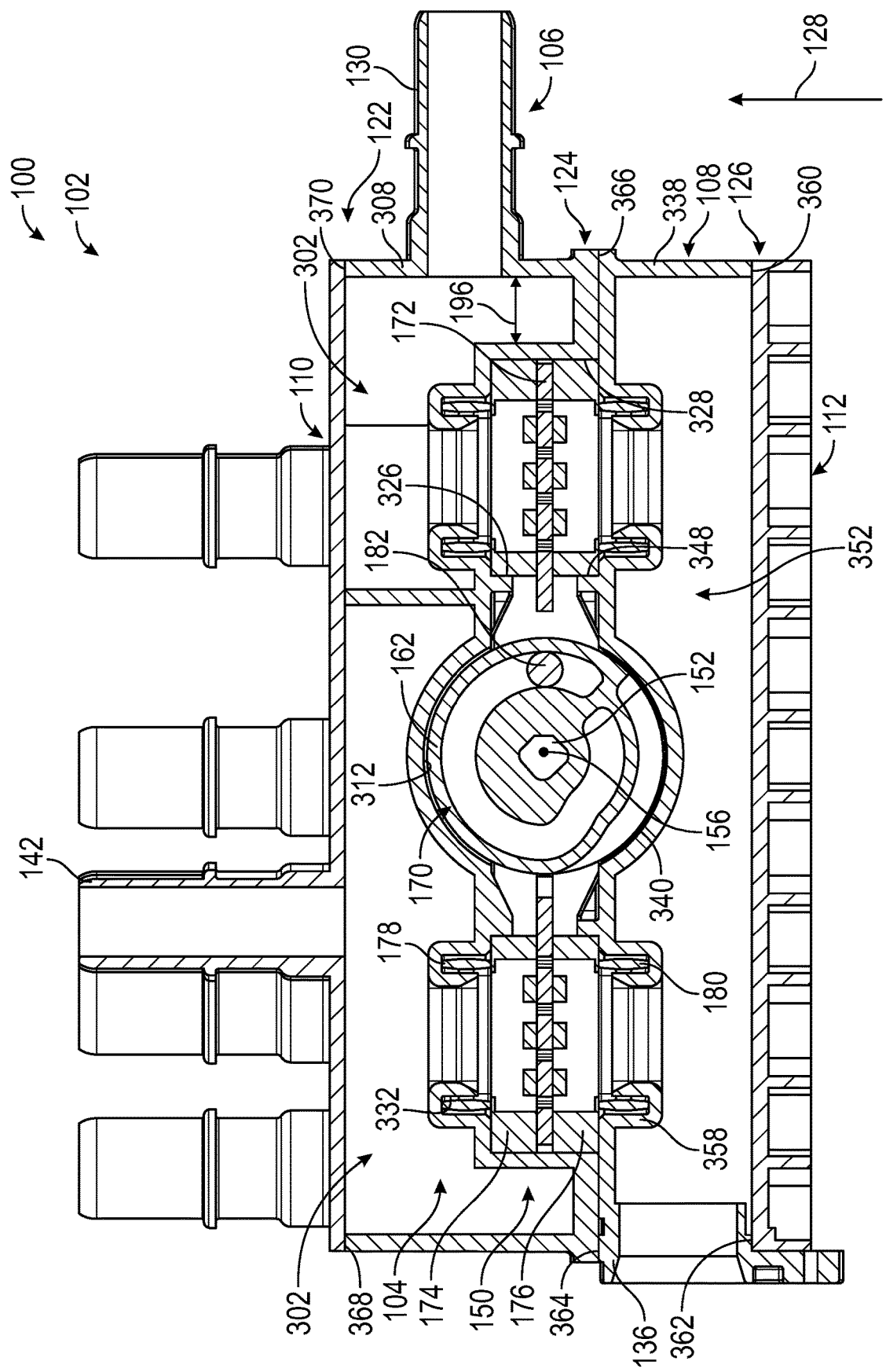
FIG. 27 is a cross-sectional view of the thermal management control valve of FIG. 2 taken along line 27-27.

In the illustrated embodiment, each of the second cam recesses 340 defines a generally half-cylindrical shape in the second housing section 108, each of which receives at least a portion of a respective one of the cam wheels 162 (see, e.g., FIG. 27). Each of the second cam recesses 340 is arranged between (e.g., in a direction parallel to the radial direction 196) a respective pair of the second louver ports 334, and a pair of the second bearing supports 342 is arranged on axially-opposite sides of each of the second cam recesses 340. Each of the second bearing supports 342 includes two opposing second bearing walls 346 that extend upwardly (e.g., away from the second side 120 of the second housing section 108) from the base wall 306. In the illustrated embodiment, the axially-outermost second bearing walls 346 are generally flat and each of the second bearing walls 346 arranged axially between the axially-outermost bearing walls 346 is U-shaped and defines a second bearing channel 347 that receives at least a portion of a respective one of the bearings 168 to axially secure the bearing 168.

In the illustrated embodiment, each of the second seal plate supports 344 extends axially along the base wall 336 and is arranged between (e.g., in a direction parallel to the radial direction 196) a respective one of the second cam recesses 340 and a respective one of the second louver ports 334. Each of the second seal plate supports 344 extends upwardly (e.g., in a direction away from the second side 120 of the second housing section 108) from the base wall 336 and includes a first seal surface 348. In some embodiments, the second seal surface 328 of the first housing section 106 may cooperate with the first seal surface 348 to contain the second seal plate 176. For example, during assembly of the thermal management control valve 100, each of the second seal plates 176 is installed on the base wall 336 so that the second seal plate 176 is arranged between (e.g., in a direction parallel to the radial direction 196) the first seal surface 348 and the second seal surface 328. During operation, the first seal surface 348 and the second seal surface 328 act to contain the second seal plate 176 and prevent the second seal plate 176 from moving with the louver plate 172 along the radial direction 196.

In the illustrated embodiment, the second housing section 108 includes one or more second pass-through ports 313 that are arranged laterally outwardly relative to the second louver ports 334. Each of the second pass-through ports 313 extends through a top surface 364 of the second housing section 108. Each of the second pass-through ports 313 is arranged to align with a respective one of the first pass-through ports 311 in the first housing section 106 to form a pass-through passage that extends through the housing assembly 102 and past a respective one of the louver assemblies 150.

Figure 24:
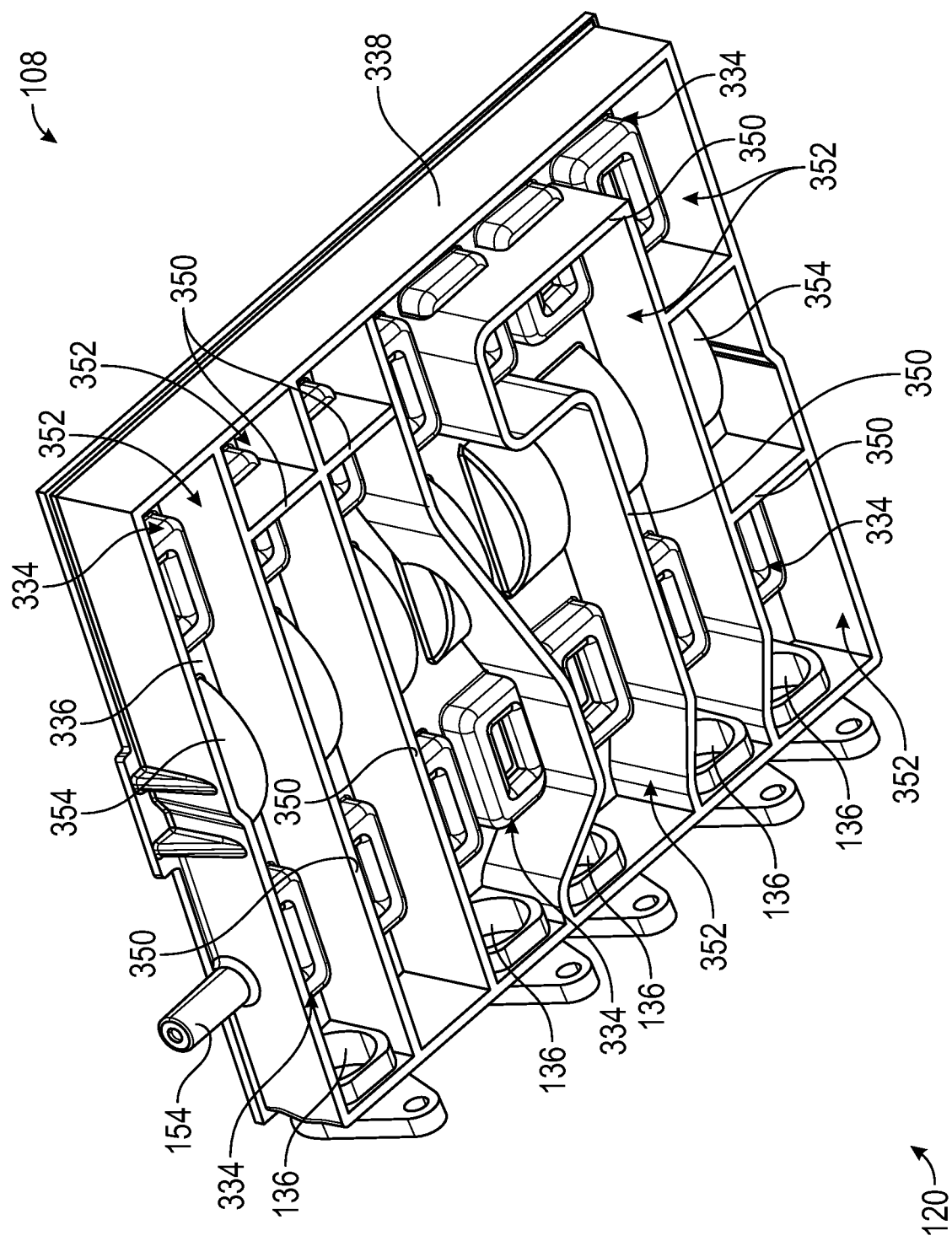
FIG. 24 is a bottom, front, left perspective view of the second housing section of FIG. 22.
Figure 25:
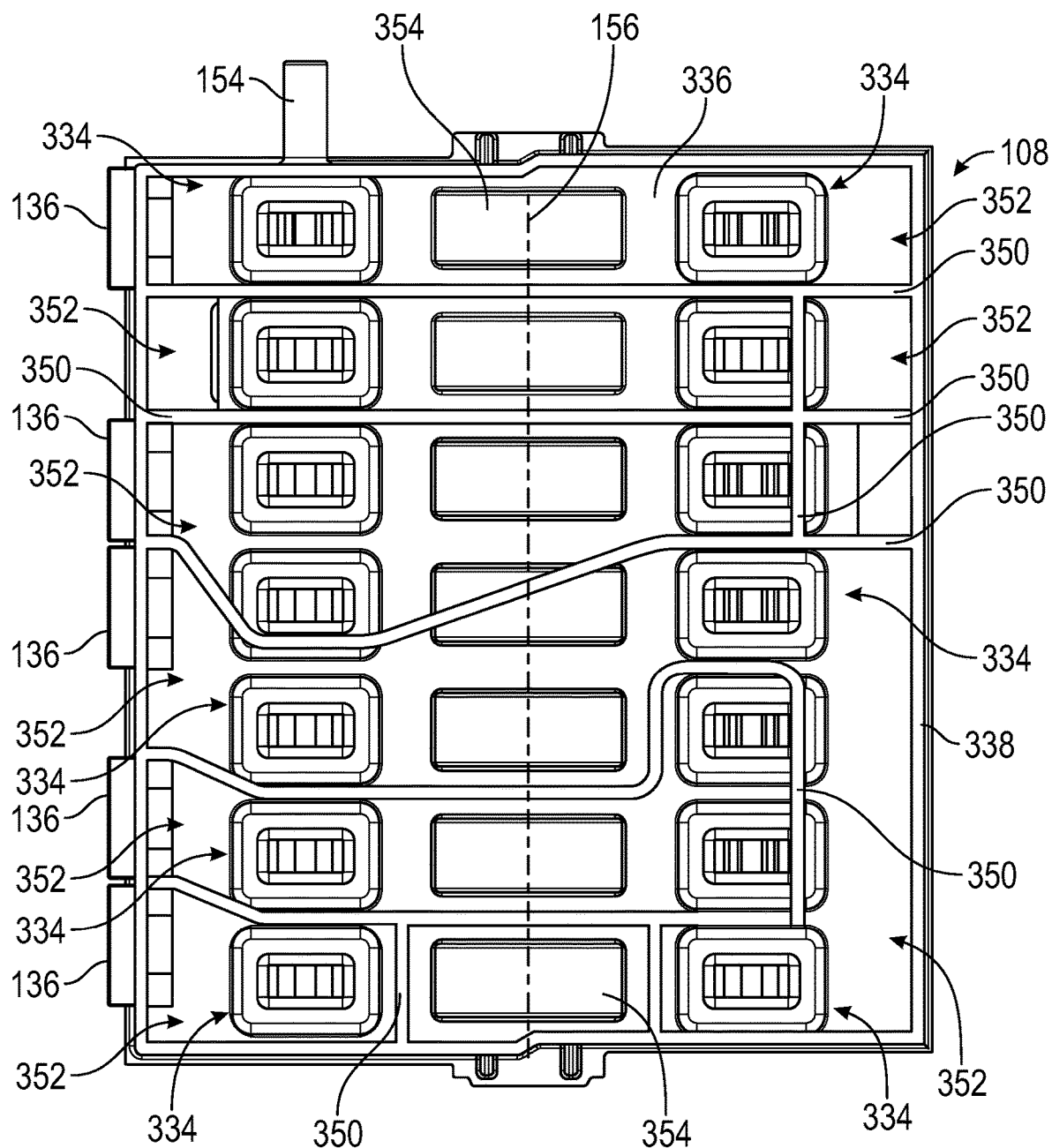
FIG. 25 is a bottom view of the second housing section of FIG. 22.

Turning to FIGS. 24 and 25, the second housing section 108 includes a plurality of internal walls 350 and a plurality of second fluid chambers 352. In general, each of the plurality of second fluid chambers 352 is at least partially formed by one or more of the internal walls 350 and/or the perimeter wall 338. When the housing assembly 102 is assembled, each of the plurality of second fluid chambers 352 forms an enclosure around one or more of the second louver ports 334. For example, the second housing cover 112 may combine with the internal walls 350 and/or the perimeter wall 338 to form the second fluid chambers 352, each of which encloses one or more of the second louver ports 334.

In the illustrated embodiment, the plurality of internal walls 350 extend downwardly from the base wall 336 (e.g., in a direction parallel to the stacking direction 128 and away from the first side 118 of the second housing section 108). In the illustrated embodiment, the internal walls 350 form different configurations for the second fluid chambers 352 that provide different flow areas (e.g., more or less of the second louver ports 334 may be connected to increase or decrease a flow area), flow paths, and connections to the ports 130, 136, 142. For example, at least one of the second fluid chambers 352 is in fluid communication with only one of the second louver ports 334. In some embodiments, at least one of the second fluid chambers 352 connects two or more of the second louver ports 334. In some embodiments, at least one of the second fluid chambers 352 connects two or more of the second louver ports 334 that are arranged on the same radial side of the drive axis 156 and axially spaced from one another. In some embodiments, at least one of the second fluid chambers 352 connects two of the second louver ports 334 that are arranged on radially-opposing sides of the drive axis 156 and are axially aligned. In some embodiments, at least one of the second fluid chambers 352 connects two of the second louver ports 334 that are arranged on radially-opposing sides of the drive axis 156 and are axially spaced. In some embodiments, at least one of the second fluid chambers 352 connects one or more of the second louver ports 334 on a first radial side of the drive axis 156 with one or more of the second louver ports 334 on a second radial side of the drive axis 156 that is opposite to the first radial side.

In general, the second housing section 108 may be designed to include any configuration of the internal walls 350 to design a particular set of fluid chambers that accommodate the flow requirements (e.g., flow area, etc.) for a specific arrangement of thermal management components. Because the second housing section 108 is fabricated by an injection molding process, the design, number, and arrangement of the internal walls 350, and the corresponding second fluid chambers 352 formed thereby, may be easily changed by modifying the mold that is used to manufacture the second housing section 108. Additionally, the axial length of the second housing section 108 may be increased to decreased to accommodate more or less of the flow control units (e.g., the cam wheels 162 and the corresponding louver plate assemblies 150 coupled thereto). Further, the second pass-through ports 313 may be easily formed in the second housing section 108.

In the illustrated embodiment, each of the plurality of second cam recesses 340 forms a second cam protrusion 354 that extends outwardly from (e.g., downward from the perspective of FIG. 24) the base wall 336. In the illustrated embodiment, each of the second cam protrusions 354 defines a half-cylindrical shape.

Figure 26:
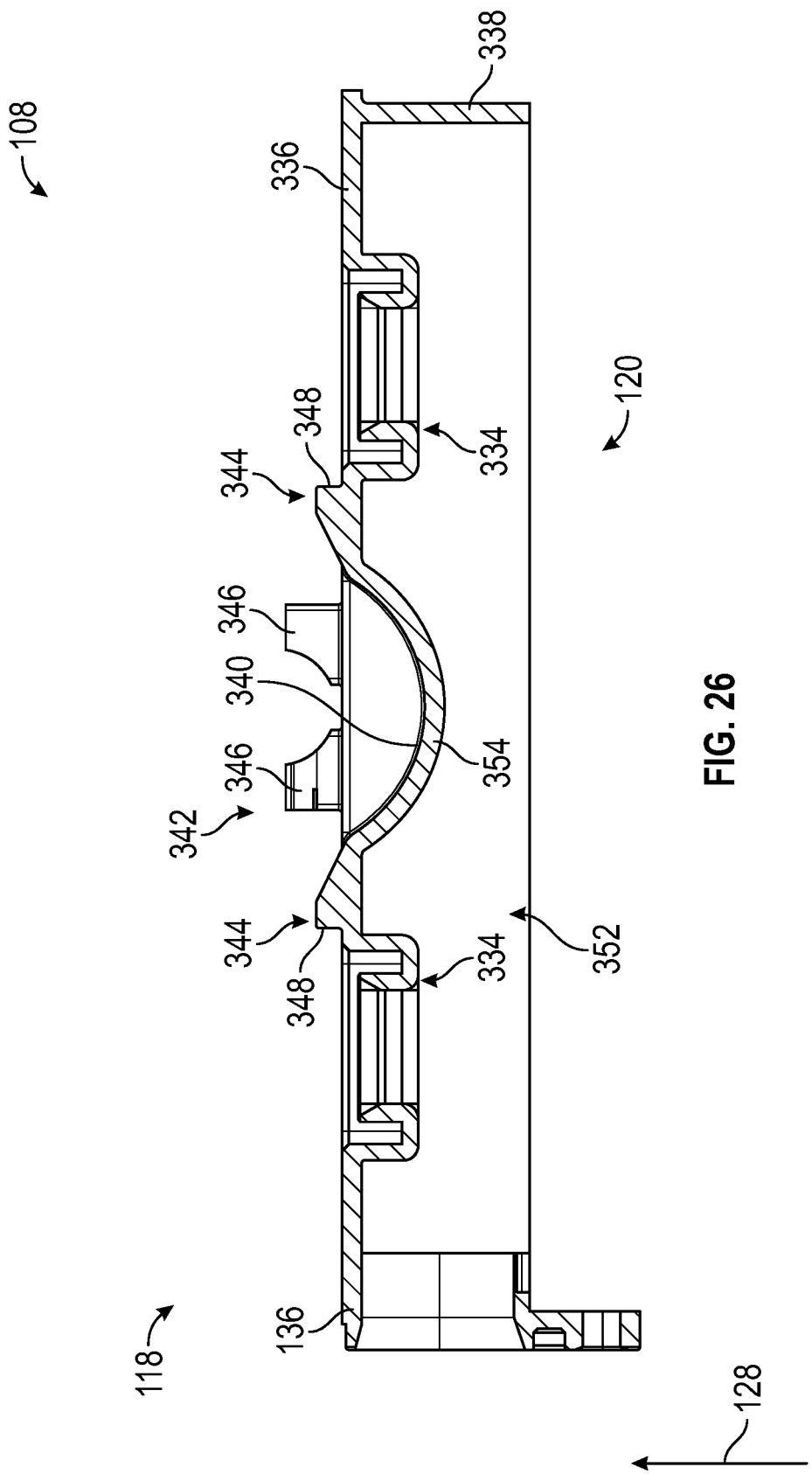
FIG. 26 is a cross-sectional view of the first housing section of FIG. 23 taken along line 26-26.

With specific reference to FIG. 26, each of the second louver ports 334 is formed by a port wall 356 that extends downwardly (e.g., in a direction away from the first side 118) from the base wall 336. In the illustrated embodiment, each of the port walls 356 is U-shaped and defines a second biasing channel 358. During assembly of the thermal management control valve 100, each of the second biasing channels 358 receives a respective one of the second biasing elements 180 therein.

In general, the design and properties of the housing assembly 102 and the flow control assembly 104 enable efficient manufacture and assembly of the thermal management control valve 100. For example, with the coplanar arrangements within the housing assembly 102 and the flow control assembly 104, the thermal management control valve 100 may be sequentially assembled along the stacking direction 128 without requiring components to be internally set or assembled within a preformed cavity. An exemplary assembly of the thermal management control valve 100 will be described with reference to FIGS. 4, 5, 12, and 27. It should be appreciated that the following description is not limiting in its order and the thermal management control valve 100 may be manufactured in a different order.

In some embodiments, the second housing cover 112 may be assembled to the second housing section 108 by stacking the second housing section 108 on the second housing cover 112 so that a bottom surface 360 of the perimeter wall 338 engages a top surface 362 of the second housing cover 112. The engagement between the bottom surface 360 and the top surface 362 of the second housing cover 112 is formed along a coplanar interface. In other words, when the second housing section 108 is installed on the second housing cover 112, the bottom surface 360 and the top surface 362 are coplanar and the third bonding interface 126 is formed along the interface between the bottom surface 360 and the top surface 362. The second housing section 108 is bonded to the second housing cover 112 (e.g., via a welding process) along the third bonding interface 126, which couples the second housing section 108 to the second housing cover 112. In some embodiments, the third bonding interface 126 may include an angled section or an arcuate section along which the second housing section 108 is bonded to the second housing cover 112.

With the second housing section 108 and the second housing cover 112 coupled together, at least a portion of the flow control assembly 104 may be installed on the second housing section 108. For example, each of the second biasing elements 180 is installed into a respective one of the second biasing channels 358 (see, e.g., FIG. 27). In some embodiments, the second biasing elements 180 are press-in-place seals and are pressed into the second biasing channels 358. The second seal plates 176 are stacked on the second biasing elements 180 so that each of the second seal plates 176 engages a respective one of a first seal surfaces 348 of the second housing section 108 (see, e.g., FIG. 27).

At least a portion of the cam 160 may be installed onto the second housing section 108. For example, the each of the cam wheels 162 and the bearings 168 may be axially inserted onto the cam shaft 166, with the cam wheels 162 being in a predefined rotational orientation relative to one another (that corresponds with the movement profile of the louver plates 172 coupled thereto). The cam shaft 166, including the cam wheels 162 and the bearings 168, may be installed onto the second housing section 108 so that each of the cam wheels 162 is at least partially received within a respective one of the second cam recesses 340, and each of the bearings 168 is at least partially received within a respective pair of the second bearing channels 347. The cam shaft 166 may be installed on the second housing section 108 in a predefined orientation that defines an initial position for each of the cam wheels 162, the cam slots 170, and the louver plates 172.

Each of the louver plates 172 may be stacked on top of a respective one of the second seal plates 176 and coupled to a respective one of the cam wheels 162 by inserting the pin 182 into a respective one of the cam slots 170. Each of the first seal plates 174 may be stacked on top of a respective one of the louver plates 172 and the first housing section 106 may be installed onto the second housing section 108, which encloses each of the louver plate assemblies 150 between the first housing section 106 and the second housing section 108. For example, each of the first biasing elements 178 may be inserted within a respective one of the first biasing channels 332. In some embodiments, the first biasing elements 178 are press-in-place seals and are pressed into the first biasing channels 332.

With the first biasing elements 178 installed onto the first housing section 106, the first housing section 106 may be assembled to the second housing section 108 by stacking the first housing section 106 on the second housing section 108 so that a top surface 364 of the perimeter wall 308 engages a bottom surface 366 of the perimeter wall 338. The engagement between the top surface 364 and the bottom surface 366 is formed along a coplanar interface. In other words, when the first housing section 106 is installed on the second housing section 108, the top surface 364 and the bottom surface 366 are coplanar and the second bonding interface 124 is formed along the interface between the top surface 364 and the bottom surface 366. The first housing section 106 is bonded to the second housing section 108 (e.g., via a welding process) along the second bonding interface 124, which couples the first housing section 106 to the second housing section 108. In some embodiments, the second bonding interface 124 may include an angled section or an arcuate section along which the first housing section 106 is bonded to the second housing section 108.

In general, the design of the housing assembly 102 enables the placement of the second bonding interface 124 to be moved (e.g., up or down from the perspective of FIG. 27) to accommodate the position of the flow control assembly 104. For example, a position of the rotary actuator 148 and the drive shaft 152 may be chosen and the housing assembly 102 may be built around the rotary actuator 148 (e.g., by altering a height along the stacking direction 128 of the features of the first housing section 106 and the second housing section 108). In this way, for example, the second bonding interface 124 can be located so that it does not intersect with the drive shaft 152 (i.e., the drive shaft 152 is offset from the second bonding interface 124), which improves the manufacturability of the housing assembly 102.

In some embodiments, the first housing cover 110 is assembled to the first housing section 106 prior to the first housing section 106 being assembled to the second housing section 108. In some embodiments, the first housing cover 110 is assembled to the first housing section 106 after the first housing section 106 is assembled to the second housing section 108. Regardless of the particular order, the first housing cover 110 may be assembled to the first housing section 106 by stacking the first housing cover 110 on the first housing section 106 so that a bottom surface 368 of the first housing cover 110 engages a top surface 370 of the first housing section 106. The engagement between the bottom surface 368 and the top surface 370 is formed along a coplanar interface. In other words, when the first housing cover 110 is installed on the first housing section 106, the bottom surface 368 and the top surface 370 are coplanar and the first bonding interface 122 is formed along the interface between the bottom surface 368 and the top surface 370. The first housing section 106 is bonded to the first housing cover 110 (e.g., via a welding process) along the first bonding interface 122, which couples the first housing section 106 to the first housing cover 110. In some embodiments, the first bonding interface 122 may include an angled section or an arcuate section along which the first housing section 106 is bonded to the first housing cover 110.

When the first housing section 106 is installed on the second housing section 108, each of the cam wheels 162 may be at least partially received within a respective one of the first cam recesses 312. Additionally, each of the first seal plates 174 is arranged between (e.g., in a direction parallel to the radial direction 196) the first seal surface 326 and the second seal surface 328, and each of the second seal plates 176 is arranged between (e.g., in a direction parallel to the radial direction 196) the first seal surface 348 and the second seal surface 328.

With the thermal management control valve 100 assembled, each of the louver plate assemblies 150 is sealed between the first housing section 106 and the second housing section 108. For example, the first biasing element 178 and the second biasing element 180 bias the first seal plate 174 and the second seal plate 176, respectively, into the louver plate 172, which aids in forming and/or maintaining the mechanical face seal between the louver plate 172 and each of the first seal plate 174 and the second seal plate 176. Because the sealing of the louver plates 172 occurs at a location that is arranged remotely from the cam 160 and the drive shaft 152, the durability of the cam 160 and the interface between the louver plate 172 and the cam 160 is improved (e.g., when compared to conventional thermal management control valves). In addition, the individual sealing of the louver plate assemblies 150 at a location remote from the cam 160 and the drive shaft 152 may eliminate a need for additional seals at the interface between the louver plates 172 and the cam 160.

As described herein, the thermal management control valve 100 is assembled or manufactured by stacking the components of the housing assembly 102 and the flow control assembly 104 (e.g., along the stacking direction 128), which simplifies the assembly of the thermal management control valve 100. And bonding the components of the housing assembly 102 along coplanar interfaces (e.g., the first bonding interface 122, the second bonding interface 124, and the third bonding interface 126) improves the manufacturing efficiency of the thermal management control valve 100.

Operation of the thermal management control valve 100, according to an exemplary embodiment, will be described with reference to FIGS. 12 and 27-29. It should be appreciated that the following description relates to one of the louver plate assemblies 150 and this description applies to each of the louver plate assemblies 150 of the flow control assembly 104. With specific reference to FIGS. 28 and 29, the rotational orientation of the cam wheel 162 relative to the louver plate 172 may determine an initial position of the louver plate 172. For example, the position of the pin 182 along the cam slot 170 when the louver plate 172 is installed onto the cam 160 may determine the initial position of the louver plate 172. In some embodiments, the initial position may correspond with the louver plate 172 being in the open position (see, e.g., FIG. 28). In some embodiments, the initial position may correspond with the louver plate 172 being in the closed position (see, e.g., FIG. 29). Regardless of the initial position of the louver plate 172, the design and properties of housing assembly 102 and the flow control assembly 104 enable the louver plate 172 to selectively provide or inhibit fluid flow between one or more of the first fluid chambers 302 and one or more of the second fluid chambers 352.

For example, to move the louver plate 172 from the open position (FIG. 28) to the closed position (FIG. 29), the rotary actuator 148 may be energized and instructed (e.g., by a controller with a processor and memory) to rotate the drive shaft 152 to a predefined rotary position. In the illustrated embodiment, the drive shaft 152 is rotated clockwise, which results in the same clockwise rotation of the cam wheel 162 and the cam slot 170. The cam slot 170 rotates so that the pin 182 is arranged within a portion of the cam slot 170 that defines a different radial distance, which results in movement of the louver plate 172 along the radial direction 196. In the illustrated embodiment, the louver plate 172 moves from the open position to the closed position because the cam slot 170 rotates to position the pin 182 within a portion of the cam slot 170 that defines a radial distance that is less that when the louver plate 172 is in the open position. Arranging the pin 182 within a portion of the cam slot 170 that defines a smaller radial distance, pulls the louver plate 172 along the radial direction 196 in a direction toward the drive axis 156 (e.g., to the left from the perspective of FIG. 28).

To move the louver plate 172 from the closed position to the open position, the rotary actuator 148 may be energized and instructed (e.g., by a controller with a processor and memory) to rotate the drive shaft 152 to another predefined rotary position. In the illustrated embodiment, the drive shaft 152 is rotated counterclockwise, which results in the same counterclockwise rotation of the cam wheel 162 and the cam slot 170. The cam slot 170 rotates so that the pin 182 is arranged within a portion of the cam slot 170 the defines a different radial distance, which results in movement of the louver plate 172 along the radial direction 196. In the illustrated embodiment, the louver plate 172 moves from the closed position to the open position because the cam slot 170 rotates to position the pin 182 within a portion of the cam slot 170 that is greater than when the louver plate 172 is in the closed position. Arranging the pin 182 within a portion of the cam slot 170 that defines a smaller distance pushes the louver plate along the radial direction 196 in a direction away from the drive axis 156 (e.g., to the right from the perspective of FIG. 29).

It should be appreciated that the rotary actuator 148 may not be required rotate in opposite directions to transition the louver plate 172 between the open position and the closed position. For example, the cam slot 170 may include several changes in the radial distance that occur along a particular circumferential direction along the cam slot 170 (see, e.g., FIGS. 14-16), which result in the louver plate 172 moving between the open position and the closed position (or vice versa) as the rotary actuator 148 rotates the drive shaft 152 in one direction. Accordingly, the geometry of the cam slot 170 that the louver plate 172 is coupled to may dictate the opening and closing of the louver plate 172 based on the rotary position of the drive shaft 152. In this way, for example, all of the louver plates 172 in the flow control assembly 104 can operate independently from one another to selectively inhibit or allow flow between the fluid chambers and ports in fluid communication with the louver plates 172, and any number of ports and/or thermal management components can be controlled with a single rotary actuator 148.

Figure 28:
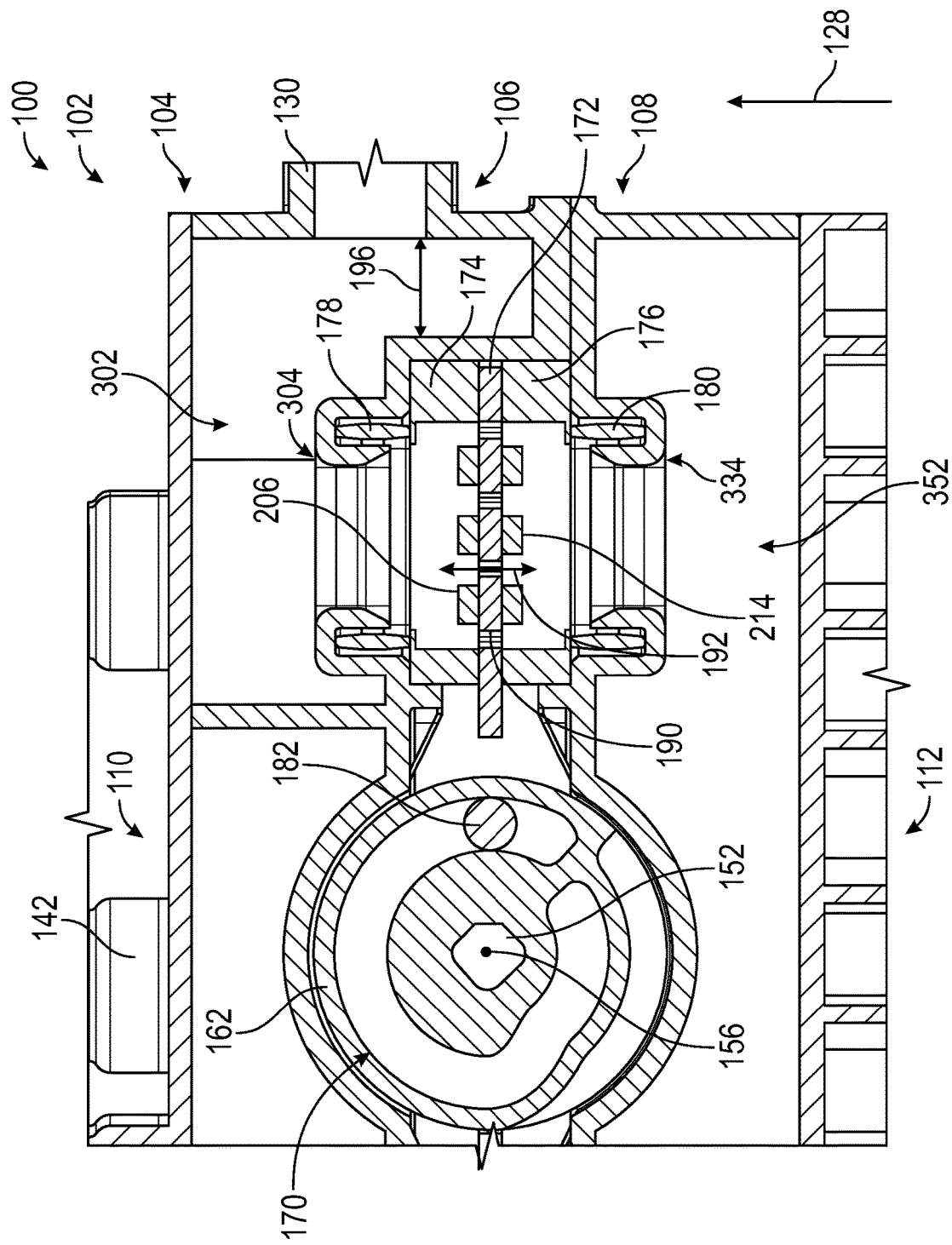
FIG. 28 is an enlarged view of a portion of the thermal management control valve of FIG. 27 with a louver plate in an open position.

With specific reference to FIG. 28, in the open position, each of the louver slots 190 is aligned with a respective pair of the seal slots (e.g., one of the seal slots 206 and one of the seal slots 214) so that fluid flow is allowed through the louver slots 190 along the flow direction 192. In some embodiments, the first fluid chamber 302 of FIG. 28 acts as an inlet that receives fluid flow from one of the first ports 130, and the second fluid chamber 352 acts as an outlet that receives fluid that flows through the louver plate 172 and provides the fluid flow to one of the second ports 136 (see, e.g., FIG. 27). Accordingly, when the louver plate 172 is in the open position, fluid flow is allowed from the first port 130 and into the first fluid chamber 302, then through the first louver port 304 and the louver slots 190, out the second louver port 334 to the second fluid chamber 352, and finally out through the second port 136.

Figure 29:
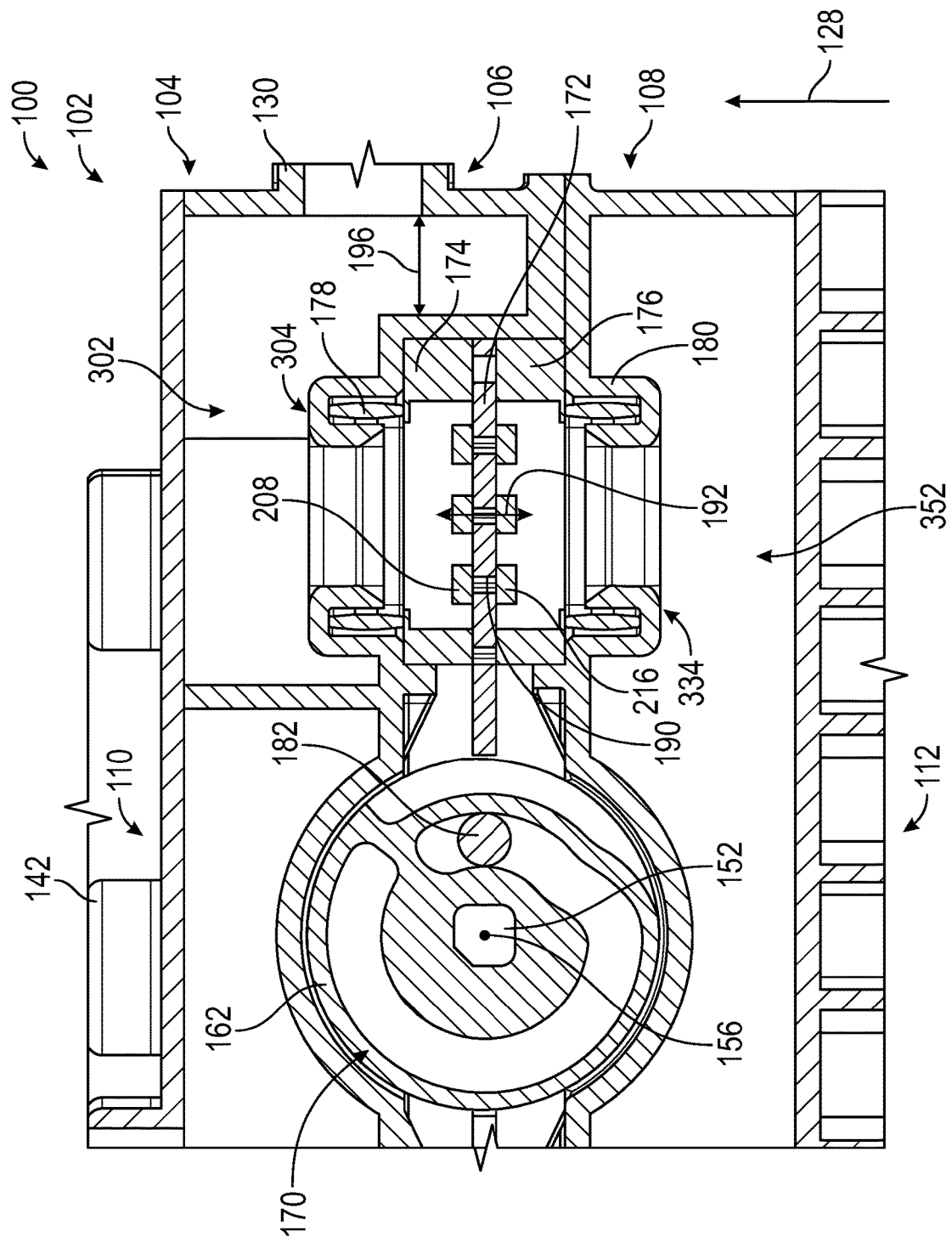
FIG. 29 is an enlarged view of a portion of the thermal management control valve of FIG. 27 with a louver plate in a closed position.

With specific reference to FIG. 29, in the closed position, each of the louver slots 190 is blocked by the first seal plate 174 and the second seal plate 176. Specifically, the louver slots 190 that remain within the fluid flow path defined between the first louver port 304 and the second louver port 334 are each blocked by a respective pair of the bars (e.g., one of the bars 208 of the first seal plate 174 and one the bars 216 of the second seal plate 176). In this way, for example, fluid flow through the louver plate 172 is inhibited. Accordingly, fluid flow is inhibited between the first port 130/the first fluid chamber 302 and the second port 136/the second fluid chamber 352. In the illustrated embodiment, at least one of the louver slots 190 moves outside of the fluid flow path defined between the first louver port 304 and the second louver port 334, and is blocked by a body of the first seal plate 174 and the second seal plate 176.

In some operating conditions, in the closed position, the fluid within the first fluid chamber 302 and/or the second fluid chamber 352 applies a back pressure force on the louver plate 172 that acts in a direction parallel to the flow direction 192 (e.g., parallel to the first surface normal 198 and the second surface normal 200). In conventional thermal management control valves, the back pressure force increases the amount of force required to move the flow control mechanism (e.g., the structure the controls whether fluid flow is provided or inhibited), which significantly increases a cost associated with the actuator of the control valve. The cost of an actuator and the amount of force or torque that the actuator is configured to output are exponentially related (i.e., more force, exponentially higher cost), so the back pressure effect (i.e., having to overcome back pressure forces during operation) result in higher cost control valve in conventional thermal management systems on electric vehicles.

The thermal management control valve 100 described herein overcomes these deficiencies due to back pressure by actuating the louver plate 172 along a direction that is substantially perpendicular to the back pressure forces. In this way, for example, the back pressure force does not act directly on the cam 160 because the movement direction of the louver plate 172 (i.e., the radial direction 196) is perpendicular to the back pressure force (e.g., parallel to the flow direction 192). Accordingly, the rotary actuator 148 can be designed to output a lower force or torque, when compared to conventional thermal management control valves, which greatly reduces a cost of the thermal management control valve 100. In addition, the lower forces required for actuating the louver plates 172 improves the durability of the thermal management control valve 100.

The design of the thermal management control valve 100 also enables customization of the fluid flow to meet the requirements of a particular thermal management system in an electric vehicle. For example, the flow area may be increased or decreased by adding or removing louver plates 172 to the flow path (e.g., the first fluid chamber 302 and/or the second fluid chamber 352). In this way, for example, the flow requirements may be met for a particular thermal management component (e.g., connected to one of the ports 130, 136, 142) by designing the housing assembly 102 to accommodate the flow requirements for one or more thermal management components.

Figure 30:
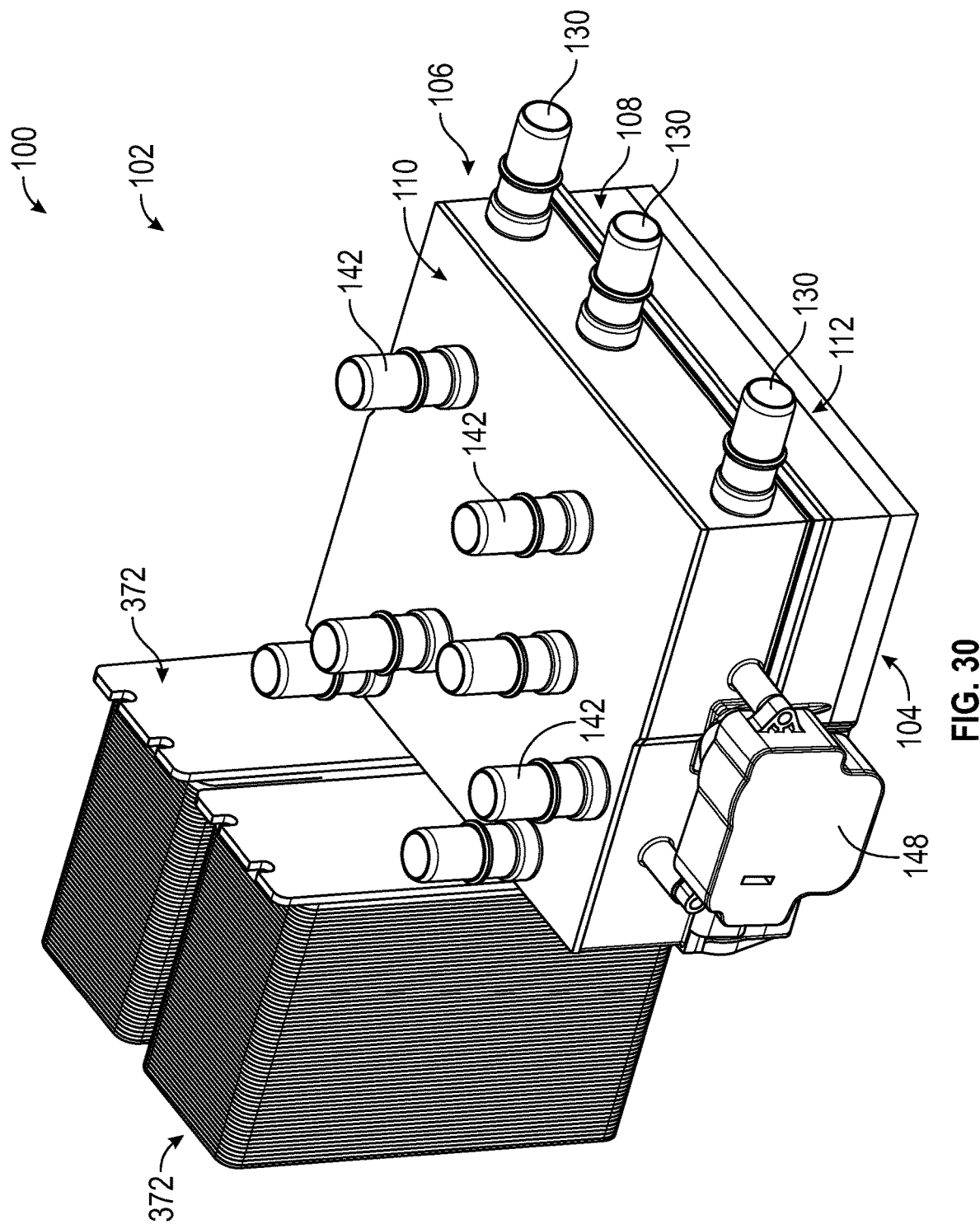
FIG. 30 is a top, front, left perspective view of the thermal management control valve of FIG. 1 connected to one or more heat exchangers.
Figure 31:
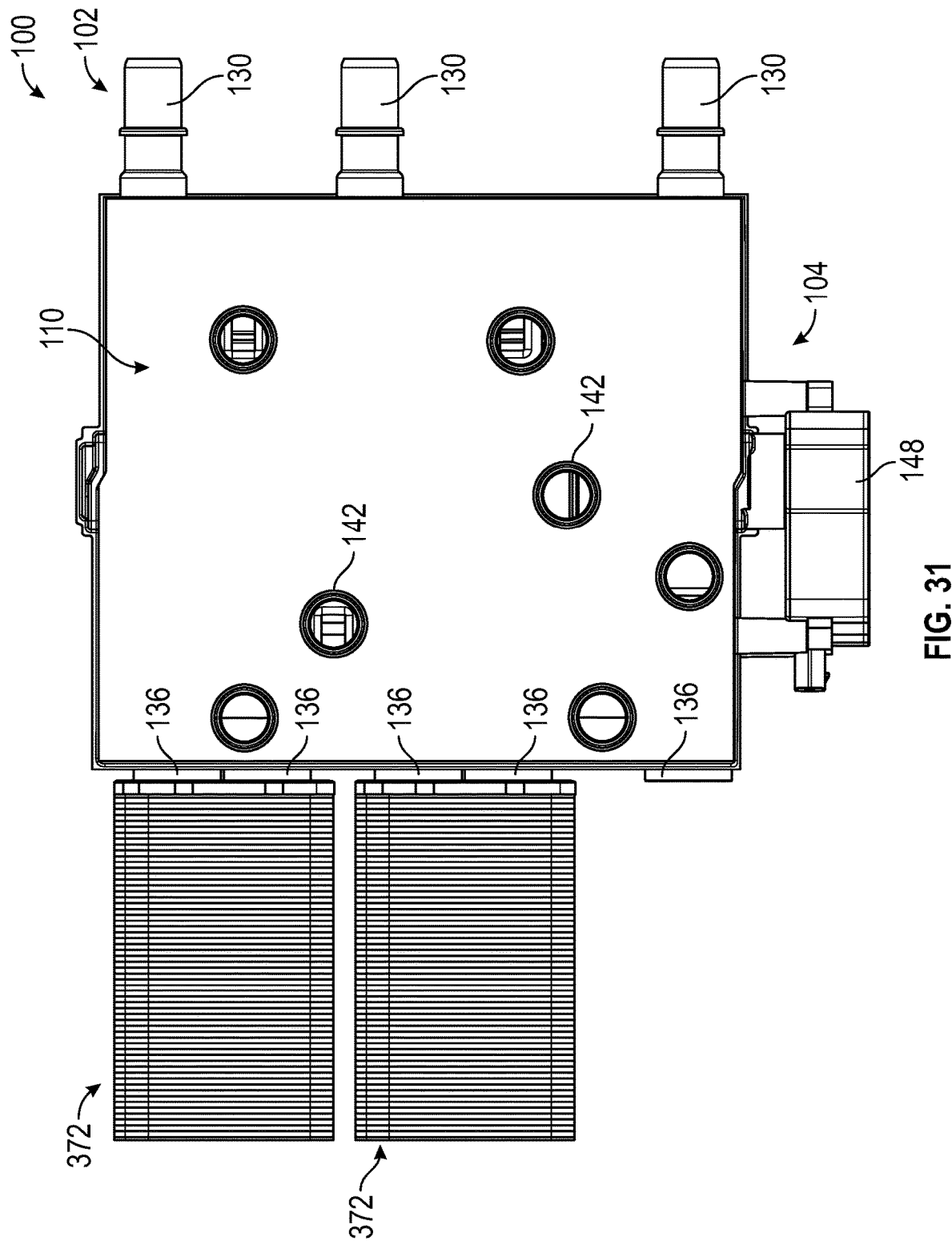
FIG. 31 is a top view of the thermal management control valve of FIG. 30.

FIGS. 30 and 31 illustrate an exemplary embodiment of the thermal management control valve 100 connected to one or more thermal management components. In the illustrated embodiment, the thermal management control valve 100 is connected to one or more heat exchangers 372. As described herein, arranging the second ports 136 within a common component (i.e., the second housing section 106) in a coplanar arrangement helps ensure that the second ports 136 are properly oriented relative to the ports on the heat exchangers 372 after installation on an electric vehicle. In addition, the design of the housing assembly 102 enables the number and position of the ports 130, 136, 142 to be easily adapted to accommodate a particular arrangement of thermal management components, which is illustrated in FIGS. 30 and 31 with the heat exchangers 372 being connected to a different number of ports.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the thermal management control valve 100 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A thermal management control valve for an electric vehicle, the thermal management control valve comprising:
   a first housing defining a first fluid chamber;
   a second housing coupled to the first housing and defining a second fluid chamber;
   a rotary actuator including a drive shaft, the drive shaft defining a drive axis;
   a cam coupled to the drive shaft and including a cam slot that extends circumferentially around the drive axis, wherein the cam slot extends circumferentially around a majority of the cam, wherein the cam slot defines a first portion at a first circumferential position and a second portion at a second circumferential position, and wherein the first portion extends a first radial distance from the drive axis and the second portion extends a second radial distance from the drive axis, the first radial distance being less than the second radial distance; and a louver plate sealed between the first housing and the second housing and including a plurality of louver slots extending through the louver plate along a louver flow direction, wherein the louver plate is coupled to the cam slot so that rotation of the cam selectively moves the louver plate along a radial direction relative to the drive axis, the radial direction being perpendicular to the louver flow direction.

2. The thermal management control valve of claim 1, wherein the louver flow direction is parallel to a back pressure direction defined between the first fluid chamber and the second fluid chamber.

3. The thermal management control valve of claim 1, wherein the first housing includes a first port in fluid communication with the first fluid chamber, and the second housing includes a second port in fluid communication with the second fluid chamber.

4. The thermal management control valve of claim 3, wherein the first port defines a first port axis that is parallel to a second port axis of the second port.

5. The thermal management control valve of claim 3, wherein the first port defines a first port axis that is perpendicular to a second port axis of the second port.

6. The thermal management control valve of claim 1, further comprising a second louver plate coupled to a second cam slot of the cam, wherein the louver plate and the second louver plate both include a louver surface that extends in a direction perpendicular to the louver flow direction, and wherein the louver surfaces are coplanar.

7. The thermal management control valve of claim 1, wherein the drive shaft is offset from a bonding interface formed between the first housing and the second housing.

8. The thermal management control valve of claim 1, further comprising a first plate seal arranged between the louver plate and the first housing, wherein the first plate seal includes a first plurality of seal slots extending through the first plate seal.

9. The thermal management control valve of claim 8, wherein the louver plate selectively moves along the radial direction to (a) align each of the plurality of louver slots with a respective one of the first plurality of seal slots so that fluid flow is allowed between the first fluid chamber and the second fluid chamber, or (b) misalign the plurality of louver slots and the first plurality of seal slots so that each of the plurality of louver slots is blocked by the first plate seal and fluid flow is inhibited between the first fluid chamber and the second fluid chamber.

10. The thermal management control valve of claim 8, further comprising a second plate seal arranged between the louver plate and the second housing, wherein the second plate seal includes a second plurality of seal slots that are aligned with the first plurality of seal slots along the louver flow direction.

11. The thermal management control valve of claim 10, further comprising a first biasing element biased against the first plate seal and a second biasing element biased against the second plate seal, wherein the first biasing element and the second biasing element are press-in-place seals.

12. A thermal management control valve for an electric vehicle, the thermal management control valve comprising:
a first housing;

a second housing coupled to the first housing at a bonding interface formed between the first housing and the second housing;

a rotary actuator including a drive shaft defining a drive axis, wherein the drive shaft is offset from the bonding interface so that the bonding interface extends linearly past the drive shaft;

a cam coupled to the drive shaft and including a cam slot that extends circumferentially around the drive axis, wherein the cam slot extends circumferentially around a majority of the cam; and a louver plate sealed between the first housing and the second housing and including a pin and a plurality of louver slots extending through the louver plate, wherein the pin extends into the cam slot so that rotation of the cam rotates the cam slot relative to the pin and linearly move the louver plate to selectively allow or inhibit fluid flow through the plurality of louver slots.

13. The thermal management control valve of claim 12, further comprising a second louver plate coupled to a second cam slot of the cam, wherein the louver plate and the second louver plate both include a louver surface that defines a surface normal that extends in a direction perpendicular to both a drive axis defined along the drive shaft and a radial direction along which the louver plate linearly moves, and wherein the louver surfaces are coplanar.

14. The thermal management control valve of claim 12, further comprising a first plate seal arranged between the louver plate and the first housing, and a second plate seal arranged between the louver plate and the second housing, wherein the first plate seal and the second plate seal both include a plurality of seal slots.

15. The thermal management control valve of claim 14, wherein the rotation of the cam linearly moves the louver plate to selectively (a) allow fluid flow through the plurality of louver slots by aligning each of the plurality of louver slots with a respective pair of the plurality of seal slots, or (b) inhibit fluid flow through the plurality of louver slots by blocking the plurality of louver slots with the first plate seal and the second plate seal.

16. A thermal management control valve for an electric vehicle, the thermal management control valve comprising:
a first housing;
a second housing coupled to the first housing;
a rotary actuator including a drive shaft, the drive shaft defining a drive axis;
a cam coupled to the drive shaft and including a cam slot that extends circumferentially around the drive axis, wherein the cam slot extends circumferentially around a majority of the cam, wherein the cam slot defines a first portion at a first circumferential position and a second portion at a second circumferential position, and wherein the first portion extends a first radial distance from the drive axis and the second portion extends a second radial distance from the drive axis, the first radial distance being less than the second radial distance; and
a plurality of louver plate assemblies coupled to the cam and arranged between the first housing and the second housing, each of the plurality of louver plate assemblies includes a louver plate with a louver slot and a louver surface defining a surface normal that extends in a direction perpendicular to both the drive axis and a radial direction defined relative to the drive axis,
wherein the rotary actuator is configured to rotate the cam to a predefined rotary position so that the louver plates move along the radial direction to selectively allow or inhibit fluid flow through the louver slots, and wherein each of the louver surfaces is coplanar.

17. The thermal management control valve of claim 16, wherein each of the plurality of louver plate assemblies further includes:
   a first seal plate arranged between the louver plate and the first housing; and
   a second seal plate arranged between the louver plates and the second housing, wherein each of the first seal plates and the second seal plates includes a seal slot.

18. The thermal management control valve of claim 17, wherein the louver plates move along the radial direction to selectively (a) allow fluid flow through the louver slots by aligning each of the louver slots with a respective pair of the seal slots, or (b) inhibit fluid flow through the louver slots by blocking each of the louver slots with a respective pair of the first seal plates and the second seal plates.

\* \* \* \* \*